(12) United States Patent
Marquis

(10) Patent No.: US 6,427,147 B1
(45) Date of Patent: Jul. 30, 2002

(54) DELETION OF ORDERED SETS OF KEYS IN A COMPACT O-COMPLETE TREE

(75) Inventor: Jean A. Marquis, Sierra Madre, CA (US)

(73) Assignee: Sand Technology Systems International, Quebec (CA)

( * ) Notice: Subject to any disclaimer, the term of this patent is extended or adjusted under 35 U.S.C. 154(b) by 0 days.

(21) Appl. No.: 09/141,712

(22) Filed: Aug. 28, 1998

Related U.S. Application Data

(63) Continuation-in-part of application No. 09/081,866, filed on May 20, 1998, now Pat. No. 5,930,805, and a continuation-in-part of application No. 08/565,939, filed on Dec. 1, 1995, now Pat. No. 5,758,353.

(60) Provisional application No. 60/081,005, filed on Apr. 7, 1998.

(51) Int. Cl.[7] ............................................... G06F 17/30
(52) U.S. Cl. ................................... 707/4; 707/1; 717/5
(58) Field of Search ................................. 707/200–201, 707/1, 4, 10; 717/5–10

(56) References Cited

U.S. PATENT DOCUMENTS

| 3,596,257 | A | | 7/1971 | Patel ........................... 711/171 |
| 4,429,385 | A | | 1/1984 | Cichelli et al. ................ 705/30 |
| 4,468,728 | A | | 8/1984 | Wang ............................ 707/1 |
| 4,586,027 | A | | 4/1986 | Tsukiyama et al. ............ 341/95 |
| 4,611,272 | A | | 9/1986 | Lomet ........................... 707/3 |
| 4,677,550 | A | | 6/1987 | Ferguson ....................... 707/3 |
| 4,945,475 | A | | 7/1990 | Bruffey et al. ................. 707/1 |
| 5,036,457 | A | | 7/1991 | Glaser et al. ................. 703/22 |
| 5,093,779 | A | | 3/1992 | Sakurai ......................... 707/1 |
| 5,109,336 | A | | 4/1992 | Guenther et al. ........... 711/171 |
| 5,121,493 | A | | 6/1992 | Ferguson ....................... 707/7 |
| 5,202,986 | A | | 4/1993 | Nickel ........................... 707/3 |
| 5,204,958 | A | * | 4/1993 | Cheng et al. ................ 707/102 |
| 5,210,870 | A | | 5/1993 | Baum et al. .................... 707/7 |
| 5,249,265 | A | | 9/1993 | Liang .......................... 345/356 |
| 5,274,805 | A | | 12/1993 | Ferguson et al. .............. 707/7 |
| 5,283,894 | A | * | 2/1994 | Deran ........................... 707/1 |
| 5,293,616 | A | * | 3/1994 | Flint ............................. 707/3 |
| 5,301,314 | A | * | 4/1994 | Gifford et al. ............. 707/101 |
| 5,303,367 | A | * | 4/1994 | Leenstra, Sr. et al. ...... 707/102 |
| 5,307,486 | A | * | 4/1994 | Nakamigawa ................. 707/2 |
| 5,339,411 | A | | 8/1994 | Heaton, Jr. ................. 711/171 |
| 5,404,513 | A | * | 4/1995 | Powers et al. ............. 707/102 |
| 5,408,652 | A | * | 4/1995 | Hayashi et al. ................ 707/1 |
| 5,481,702 | A | | 1/1996 | Taskahashi .................. 707/205 |
| 5,497,485 | A | * | 3/1996 | Ferguson et al. .............. 707/1 |
| 5,551,027 | A | * | 8/1996 | Choy et al. .................. 707/201 |
| 5,555,409 | A | * | 9/1996 | Leenstra, Sr. et al. ...... 707/101 |
| 5,557,786 | A | * | 9/1996 | Johnson, Jr. ................ 707/101 |
| 5,561,785 | A | | 10/1996 | Blandy et al. .............. 711/170 |
| 5,561,786 | A | | 10/1996 | Morse ......................... 707/101 |
| 5,577,243 | A | | 11/1996 | Sherwood et al. ............. 707/7 |
| 5,758,353 | A | * | 5/1998 | Marquis ..................... 707/201 |
| 5,930,805 | A | * | 7/1999 | Marquis ..................... 707/201 |

OTHER PUBLICATIONS

Orlandic et al.; Compact O–Complete Tree, Proceding of the 14th VLDB Conference; California; pp. 372–381; 1988.*

Aoe, Abstract of "Compact algorithms: key search strategies," IEEE Computer Society Technology Series., 1991, pp. 1–139.

(List continued on next page.)

Primary Examiner—Hosain T. Alam
Assistant Examiner—Jean Bolte Fleurantin
(74) Attorney, Agent, or Firm—Christie, Parker & Hale, LLP

(57) ABSTRACT

A deletion method and apparatus for deleting search keys from a data structure stored in the computer storage system comprising a compact multi-way search tree structure. The method deletes in bulk search keys based on the lexical position of the search keys, thereby avoiding repetition searches for search keys requested for deletion.

6 Claims, 22 Drawing Sheets

OTHER PUBLICATIONS

Bender, Abstract of "B–Tree/ISAM file handlers," Micro/Systems Journal: For The Advanced Computer User, Jan./Feb. 1987, pp. 58–60.

Grehan, "If Memory Serves . . . ", Byte, vol. 14, Issue 8, Aug. 1989, pp. 279–280, 282, 284, and 337.

Grehan, "Virtually Virtual Memory", Byte, vol. 15, Issue 9, Sep. 1990, pp. 455–456, 458, 460,462 and 464.

Biliris, "The Performance of Three Database Storage Structures for Managing Large Objects," AT&T Bell Laboratories, Murray Hill, New Jersey, 1992, pp. 276–285.

"E–Mail Message to J. Marquis", J. Pfaltz, Aug. 24, 1995.

Fachini, Abstract of "C–Tree Systolic Automata," Theoretical Computer Science, V56, N2, 1988, pp. 155–186.

Hulten, "An index organization for applications with highly skewed access patterns," 5th International Conference on Software Engineering, Mar. 9–12, 1981, pp. 71–78.

Johnson, Abstract of "Treemaps: Visualizing Hierarchical and Categorical Data," University of Maryland, vol. 55/04–B of Dissertation Abstracts International, 1993, pp. 1516–1849.

Kida et al., Abstract of "A topological condition imposed on the natural frequencies of two element kind network,"Transactions of the Institute of Electronics and Communication Engineers of Japan, Section E, vol. E60, No. 8, 1977, pp. 417–418.

Donald E. Knuth, "The Art of Computer Programming," Sorting and Searching, vol. 3, 1973, pp. 471–479.

Liu, Abstract of "The distances between unrooted and cyclically ordered trees and their computing methods," IEICE Transactions on Information and Systems, vol. E77–D, No. 10, 1994, pp. 1094–105.

Normann et al., Abstract of "Recent experience with C–tree—a data management system," Europhysics Conference on Control Systems for Experimental Physics. Proceedings (CERN 90–08), 1990, pp. 167–169.

Orlandic Ratko, "Design, Analysis and Applications of Compact O–Complete Trees," May 1989, p. 185.

Orlandic, "Design, Analysis and Applications of Compact O–Complete Trees," Dissertation, School of Engineering and Applied Science, University of Virginia, May 1989, p. 185.

Orlandic, "Problems of Content–Based Retrieval in Image Databases," Proceedings Third Symposium on New Generation Knowledge Engineering, IAKE 1992, Washington, D.C., Nov. 1992, pp. 374–384.

Orlandic et al., "Compact O–Complete Trees,"Proceedings of the 14th VLDB Conference, Los Angeles, California, 1988, pp. 372–381.

Orlandic et al., "Analysis of Compact O–Complete Trees: A New Access Method to Large Databases," Lecture Notes in Computer Science, Fundamentals of Computational Theory, International Conference FCT '89., Aug. 21–25, 1989, pp. 361–371.

Pfaltz, "The Adams Language: A Tutorial and Reference Manual," Department of Computer Science, University of Virginia, Charlottesville, Virginia, Apr. 1993, p. 67.

Pfaltz et al., "Implementing Subscripted Identifiers in Scientific Databases," *Lecture Notes in Computer Science 420*, Springer–Verlag, Berlin, Apr. 3–5, 1990, pp. 80–91.

Smith, Abstract of "New Approaches to Balanced Tree Data Structures (Simple Balanced Search Tree)," Univ. of Louisville, Vol. 55/02–B of Dissertation Abstracts International, 1993, pp. 497–617.

Werelius, Abstract of "C file libs reviewed: Ten packages for file management from C are put through real–world paces to test speed and flexibility," Buyer and Vendor Guide, DBMS v. 4 n.8, 1991, pp. 70–75.

Orlandic. "A High Precision Spatial Access Method Based on A New Linear Representation of Quadress," Preceedings of the ISMM International Conference, Information and Knowledge Management CIKM–92. Baltimore, Maryland, pp. 449–508, Nov. 8–11, 1992.*

Orlandic. et al. "Q.–Tree—A Dynamic Structure For Accessing Spatial Objects With Arbitrary Shapes," Institute For Parallel Computation. School of Engineering and Applied Science. University of Virginia, Charlottesville, Virginia. 41P, Dec. 6, 1991.*

* cited by examiner

0-COMPLETE BINARY TREE

FIG.4b

SEARCH KEYS REPRESENTATIVE OF ACTUAL
DATA ITEMS IN STORAGE DEVICE

| 10000001 | 10101010 | 10110010 | 00001000 | 00100101 | 01000110 | 01000010 | 10101000 |
|---|---|---|---|---|---|---|---|

↖ 39

DELETION OF ORDERED SETS OF KEYS IN A COMPACT 0-COMPLETE TREE

CROSS REFERENCE TO RELATED APPLICATION

This application is a continuation in part of U.S. patent application Ser. No. 08/565,939, filed Dec. 1, 1995, now U.S. Pat. No. 5,758,353, U.S. patent application Ser. No. 09/081,8,866, now issued as U.S. Pat. No. 5,930,805, filed May 20, 1998, and U.S. Provisional Patent Application No. 60/081,005, filed Apr. 7, 1998, the disclosures of which are incorporated herein by reference.

BACKGROUND OF THE INVENTION

The invention relates to computer data and file storage systems, and more particularly to a method and system for deleting search keys from a structure implementing a compact representation of a 0-complete tree.

Data and file storage systems such as a database, in particular those implemented in computer systems, provide for the storage and retrieval of specific items of information stored in the database. The information stored in the database is generally indexed such that any specific item of information in the database may be located using search keys. Searches are generally accomplished by using search keys to search through an index to find pointers to the most likely locations of the information in the database, whether that location is within the memory or the storage medium of the computer.

An index to database records within a computer is sometimes structured as a tree comprised of one or more nodes, connected by branches, which is stored within a storage means of the computer. Each node generally includes one or more branch fields containing information for directing a search, and each such branch field usually contains a pointer, or branch, to another node, and an associated branch key indicating ranges or types of information that may be located along that branch from the node. The tree, and any search of the tree, begins at a single node referred to as the root node and progresses downwards through the various branch nodes until the nodes containing either the items of information or, more usually, pointers to items of information are reached. The information related nodes are often referred to as leaf nodes or, since this is the level at which the search either succeeds or fails, failure nodes. Within a tree storage structure of a computer, any node within a tree is a parent node with respect to all nodes dependent from that node, and sub-structures within a tree which are dependent from that parent node are often referred to as subtrees with respect to that node.

The decision as to which direction, or branch, to take through a tree storage structure in a search is determined by comparing the search key and the branch keys stored in each node encountered in the search. The results of the comparisons to the branches depending from a given node are to be followed in the next step of the search. In this regard, search keys are most generally comprised of strings of characters or numbers which relate to the item or items of information to be searched for within the computer system.

The prior art contains a variety of search tree data storage structures for computer database systems, among which is the apparent ancestor from which all later tree structures have been developed and the most general form of search tree well known in the art, the "B-tree." (See, for example, Knuth, *The Art of Computer Programming*, Vol. 3, pp. 473–479, the disclosure of which is incorporated herein by reference). A B-tree provides both primary access and then secondary access to a data set. Therefore, these trees have often used in data storage structures utilized by database and file systems. Nevertheless, there are problems that exist with the utilization of B-tree storage structures within database systems. Every indexed attribute value must be replicated in the index itself. The cumulative effect of replicating many secondary index values is to create indices which often exceed the size of the database itself. This overhead can force database designers to reject potentially useful access paths. Moreover, inclusion of search key values within blocks of the B-tree significantly decreases the block fan out and increases tree depth and retrieval time.

Another tree structure which can be implemented in computer database systems, compact 0-complete trees (i.e., $C_0$-trees), eliminates search values from indices by replacing them with small surrogates whose typical 8-bit length will be adequate for most practical key lengths (i.e., less than 32 bytes). Thus, actual values can be stored anywhere in arbitrary order, leaving the indices to the tree structure to be just hierarchical collections of (surrogate, pointer) pairs stored in an index block. This organization can reduce the size of the indexes by about 50% to 80% and increases the branching factor of the trees, which provides a reduction in the number of disk accesses in the system per exact match query within computer database systems. (See Orlandic and Pfaltz, Compact 0-Complete Trees, *Proceedings the* 14th *VLDB Conference*, pp. 372–381, the disclosure of which is incorporated herein by reference.)

While the known method of creating $C_0$-trees increases storage utilization 50% to 80% over B-trees, there is a waste of storage space due to the presence of dummy entries (surrogate, pointer==NIL) wherein the number of index entries at the lowest level of the tree exceeds the actual number of records stored. Therefore, the expected storage utilization of index entries of $C_0$-trees at the lowest tree level is 0.567 versus 0.693 as in the case of B-trees.

Moreover, although B-trees and $C_0$-tree storage structures represent efficient methods of searching for values, both methods require initial generation and subsequent maintenance of the tree data storage structure itself. Neither of these computer storage structures inherently stores information in sorted order.

A tree can be built more efficiently if the key records are initially sorted in the order of their key field, than if records are in random order. Therefore, an efficient computer database system should sort sets of keys first, and then build a tree based on keys extracted at intervals from the sorted keys. Searches of the tree data storage structure will also be performed more efficiently if the tree does not contain an excess number of keys, namely keys that are associated with data no longer in the database or keys that are no longer necessary to maintain the structure of the tree.

One method of deleting excess keys is to search the tree structure for a key, and then perform steps appropriate for deletion of the key from the tree structure. This process is then repeated for every key desired to be deleted. In effect, for every key deleted from the tree structure, a search, beginning at the root of the tree and ending when the key is located, must be performed. Such a process may impose a large burden on the computer system storing the tree structure. This is particularly the case if a large number of keys are to be deleted at the same time or during the same process, which may often be the case as a determination as to which keys should be deleted may occur only periodically or deletion operations may be planned to occur during periods of low utilization of the data storage system. Accordingly, methods for deleting significant numbers of search keys from the tree structure without performing individual searches throughout the tree structure for those search keys are desirable.

SUMMARY OF THE INVENTION

In an embodiment of the invention, a data storage structure for minimizing the amount of information required to retrieve stored data within a computer system is comprised of entries for indexing search keys. Each entry comprises a depth value and a data present indicator having two conditions, and a tree structure stored in the computer interconnecting the entries and forming the data storage structure. Search keys may be binary representations of the data records indexed by the data storage structure or may be any other attribute or set of attributes used to look up the data records. The data storage structure further comprises a means for storing a count of each of the entries associated with a search key interval range.

The described embodiment of the present invention includes novel methods for storing, accessing and retrieving data indexed by the tree data storage structure. These methods comprise a method for sequentially processing a number of search keys within the tree structure to perform a predefined function on each search key, a method for locating a search key within the tree structure, a method for storing and indexing information for each search key within the tree structure, and a method for splitting an index block of the present invention.

An embodiment of the present invention also provides additional efficiency with regards to storage utilization beyond the already stated 50% to 80% savings of $C_0$-trees over B-trees. To alleviate the problem of waste created by $C_0$-trees at the lowest levels, a preferred embodiment of the invention replaces storage of the (surrogate, pointer) entries as physically adjacent pairs of values with two separate physical structures within the storage means of the computer, namely: 1) an index block depths structure to a list of the surrogate values including a depth value and a data present structure indicator having two conditions and 2) a pointers structure pointing to a list of every non-NIL pointer value, these being in lexicographic order. In the preferred embodiment of the invention, a NIL pointer of the prior $C_0$-tree data storage structure (i.e., a dummy entry) is represented by a data not present indicator bit in the value of the surrogate itself. The meta-data of each subtree also reflects the count of non-NIL entries for each subtree to accumulate an incremental lexical position for each indexed key within the pointers structure. Since the pointers structure does not contain any NIL pointers, only a bit of storage is necessary to indicate a NIL pointer and minimal meta-data is recorded. Therefore, storage utilization tends to revert back to that which is expected with a B-tree.

Moreover, to eliminate the inefficiency of traversing a multilevel tree structure, the keys to be added to the data storage structure of the preferred embodiment of the present invention are processed as a collection or more than one item in sorted order. In this way, greater locality of reference and reduction in traversal and maintenance of the nodes of the tree (including index block splitting) from the root to the leaf for each key can be realized. By determining if the next key is included in the key interval range of the current index block, processing of a predefined function can continue in the current index block or resume in its parent block. With this new method, splitting of an index block is deferred until all processing of the current block is completed or the block size is at an extreme maximum far greater than the normal threshold, thus, allowing for context retention of the subtree until all relevant keys have been added to that subtree.

Still other embodiments of the present invention will become readily apparent to those skilled in the art from the following detailed description, wherein is shown and described only embodiments of the invention by way of illustration for carrying out the invention. As will be realized, the invention is capable of other and different embodiments and its several details are capable of modifications in various obvious respects, all without departing from the spirit of the invention. Accordingly, the drawings and the detailed description are to be regarded as illustrative in nature and not restrictive.

BRIEF DESCRIPTION OF THE DRAWINGS

FIG. 4b is a detailed diagram of the contents of the storage container of the $C_0$-tree of FIG. 4a;

Like numbers and designations in the drawings refer to like elements.

DETAILED DESCRIPTION

A) Computer System Overview

Figure 1A:
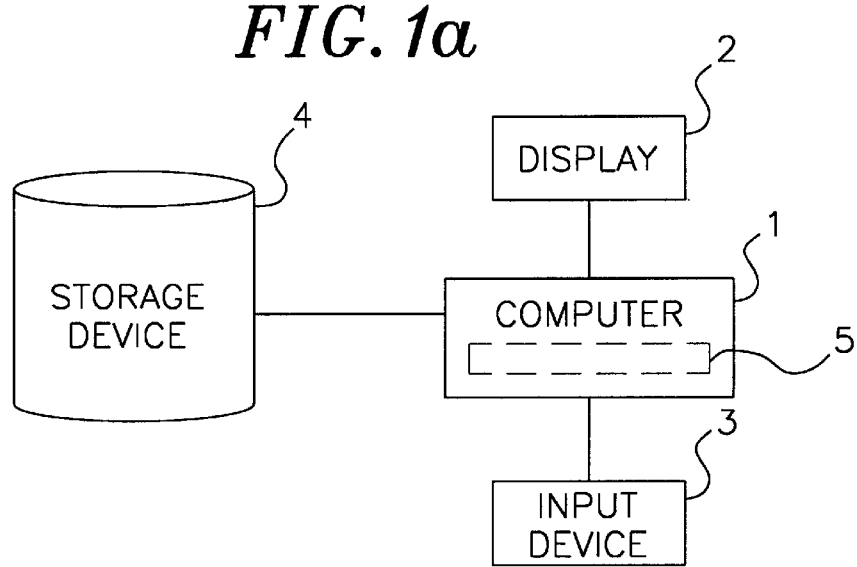
FIG. 1a is a schematic and block diagram of a computer system in which is implemented the present invention.

FIG. 1a depicts a computer system having a programmable computer and computer programs for creating a file system and for processing operations on the file system in accordance with the present invention. The system includes programmable computer 1, display 2, computer input device 3 and a storage means. The storage means comprises a storage device 4 such as a magnetic disk storage system or a partition of memory of the computer for storage of data. Hardware/and software including the file system and hardware/and software for performing processing operations to be described are implemented in a file system 5 (shown in phantom lines), which is connected with computer 1. The system 5 in connection with computer 1 coordinates the various activities related to representing data in the file system and to performing operations on one or more data files stored within the storage device 4. System 5 can be a programmed general purpose computer, such as a personal, mini or mainframe computer, or a special purpose computer formed by one or more integrated chips.

Figure 1B:
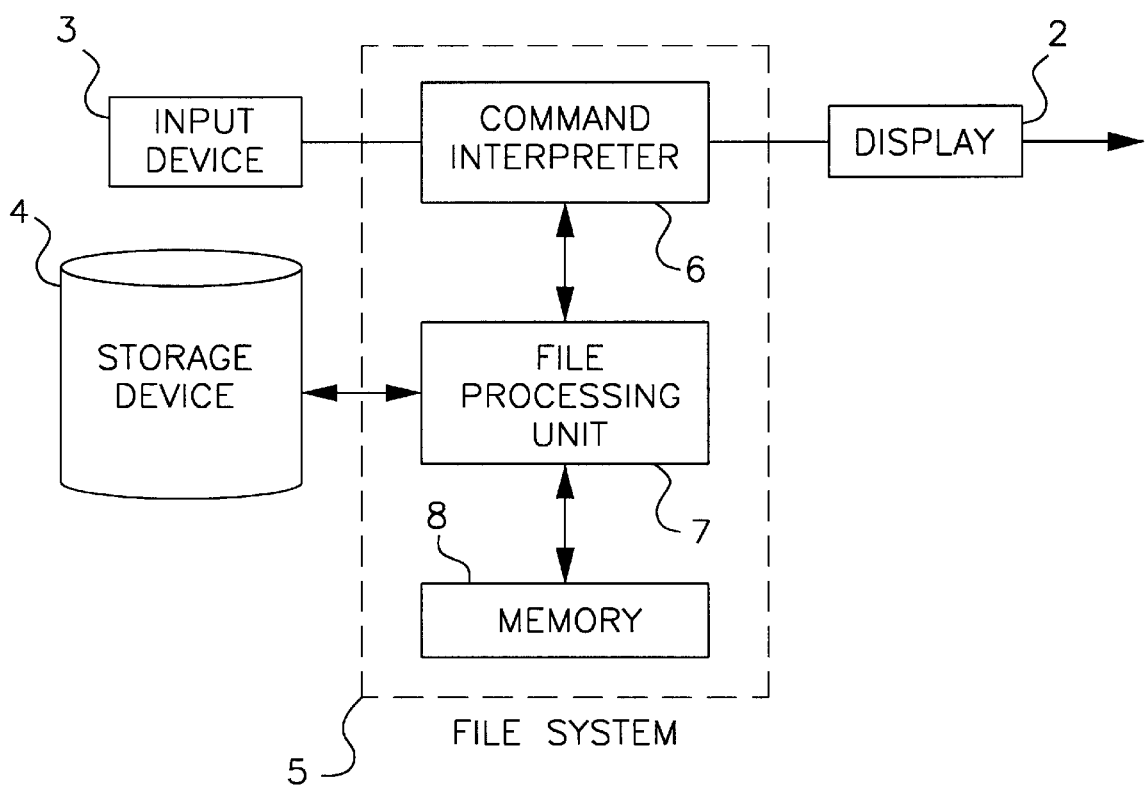
FIG. 1b is a schematic and block diagram of a database system on a computer for implementing the present invention.
Figure 4A:
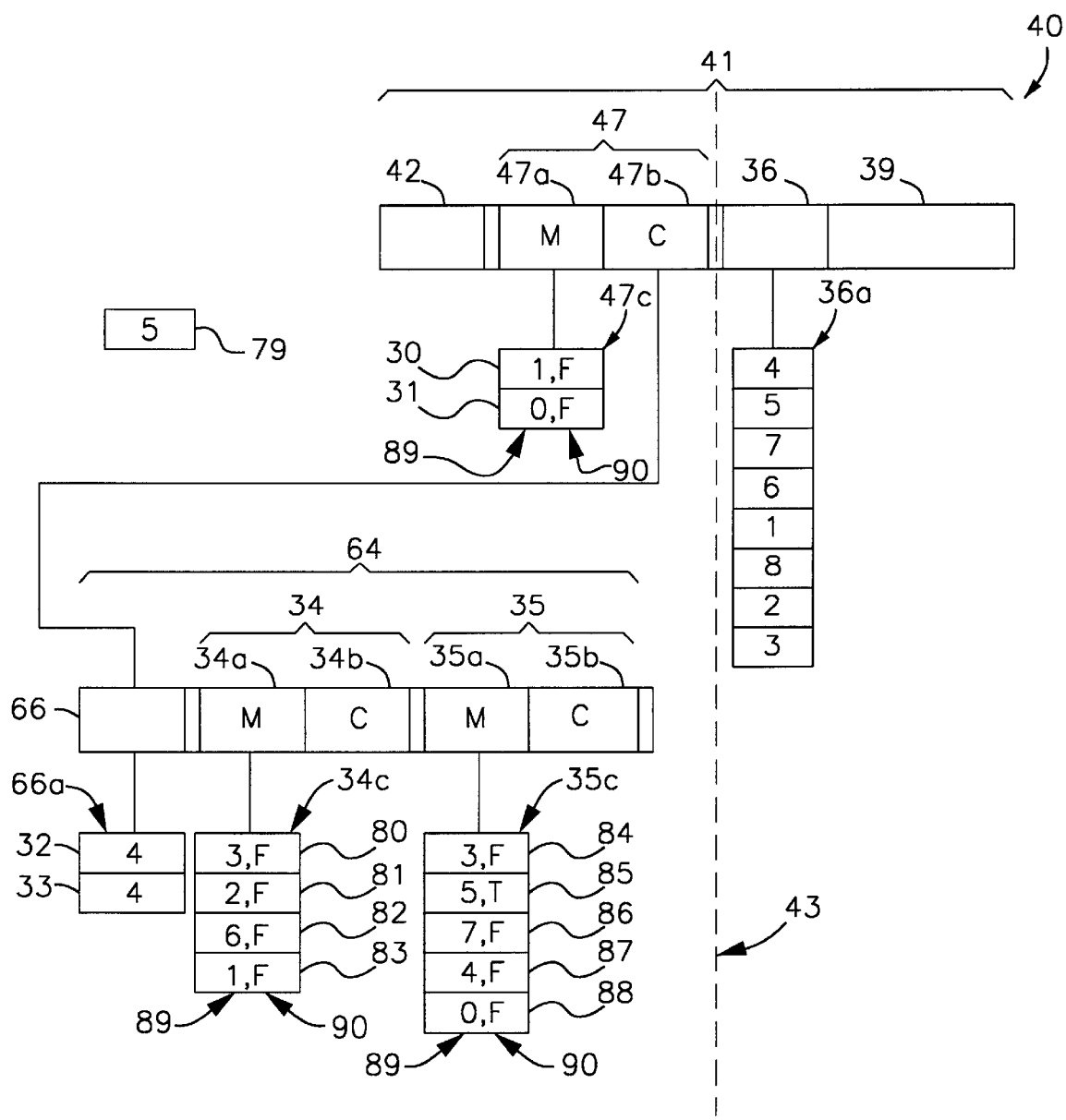
FIG. 4a illustrates an instantiation of a $C_0$-tree used in conjunction with the present invention.

Referring to FIG. 1b, file system 5 includes a file processing unit 7 and a command interpreter 6. In order to access specific items of information stored in the computer file system, the file processing unit 7 uses a compact 0-complete data storage structure 40 as depicted in FIG. 4a for minimizing the amount of information required to retrieve items of data stored within the storage device 4. The data storage structure has a plurality of entries 30, 31, 80, 81, 82, 83, 84, 85, 86, 87, 88 for indexing search keys 1420, wherein each entry comprises a depth value 89 and a data present indicator 90, the latter, by way of example having two conditions, and a novel $C_0$-tree structure 43 stored in the storage device 4 of the computer interconnecting the entries and forming the data storage structure 40. The data storage structure 40 further includes a means 66 for storing the count of the non-NIL leaf entries associated with a search key interval range. In addition, the present invention uses a separate pointers structure comprised of header 36 and entries 36a, that is distinct from the tree structure 43 and, in a typical embodiment, may be distinct from the data storage structure 40 itself. The pointers structure 36 and 36a accesses the data items within the storage container 39 of the storage device 4.

B) Binary Trees
1) Complete Binary Tree

Figure 2A:
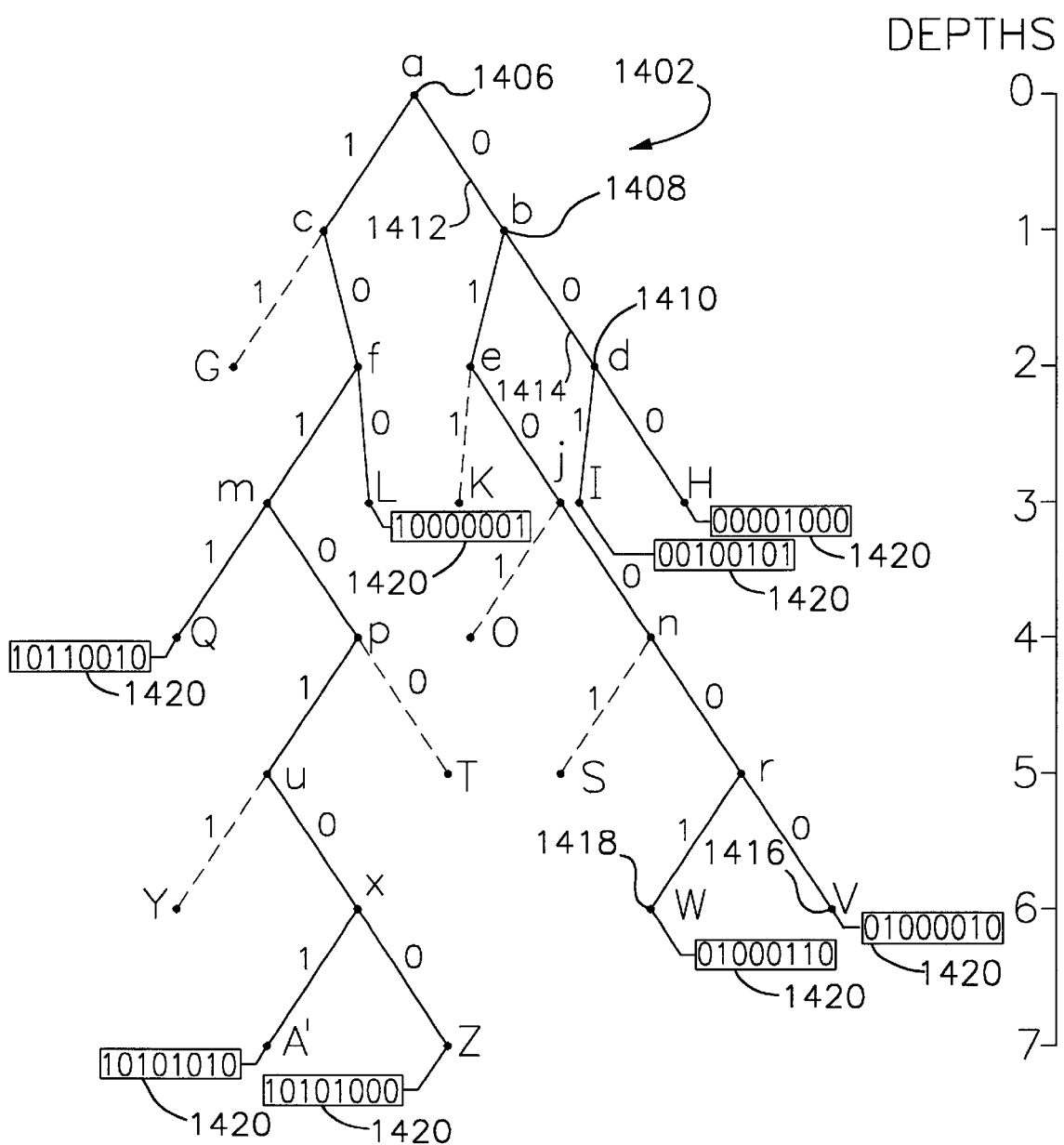
FIG. 2a is a conceptual illustration of a prior art complete binary tree.

Referring to FIG. 2a, binary tree 1402 is an illustrative edge labeled tree data storage structure consisting of nodes indicated by dots, such as 1406, 1408 and 1410, separated by arcs or edges, such as 1412 and 1414. The nodes are identified by small and capital letters a through Z and A'. The end nodes are called leaf nodes or leafs and are labeled with capital letters. All the other interior nodes are labeled with small letters. Information to be retrieved is stored in storage locations pointed to by pointers located at the tree's leaves, such as leaves 1416 and 1418. Search keys 1420 are shown for leaves H, I, V, W, L, Z, A' and Q. In FIG. 2a, the search keys 1420 are strings of binary digits with an arbitrary, uniform length up to some maximum length in bits, 8 bits being used by way of example. The search keys 1420 associated with each of these leaves are used to locate the pointer to the storage location for the corresponding leaf in the storage device 4. Only those leaves indicated by an associated search key 1420 have a pointer to a storage location that stores associated data records and therefore are said to be full. The leaves G, K, O, S, T and Y do not have pointers to a storage location and therefore are said to be empty.

Retrieval of the data records in the storage device 4 is achieved by successively comparing binary 0 and 1 symbols in one of the search keys 1420 with a 0 or 1 edge label on each arc 1412 between the nodes along a path of the connected dots and arcs starting with root node a and ending with the desired leaf. Each node or leaf of the binary tree is either a 0-node or 0-leaf if its entering arc is labeled 0, or a 1-node or 1-leaf if its entering arc is labeled 1. In a computer database and file management system, an access path to a node is a binary string obtained by concatenating the 0 and 1 edge labels traversed from the root node a to the particular node in question.

Binary tree structures are said to be "complete" if every node is either a leaf or is a node that has exactly two non-empty direct descendants (i.e., nodes having a dependent 0-node and a dependent 1-node). In FIG. 2a, each node from node a to node A' satisfies the two conditions for 0-completeness.

Thus, FIG. 2a depicts a tree storage structure with the search keys 1420, including 00001000, 00100101, 01000010, 01000110, 1000001, 10101000, 10101010 and 10110010, to locate data records at leaves H, I, V, W, L, Z, A' and Q respectively. Empty leaves G, K, O, T, S and Y are included within the tree 1402 to fulfill the requirement of a "complete" binary tree.

2) 0-Complete Binary Tree

Figure 2B:
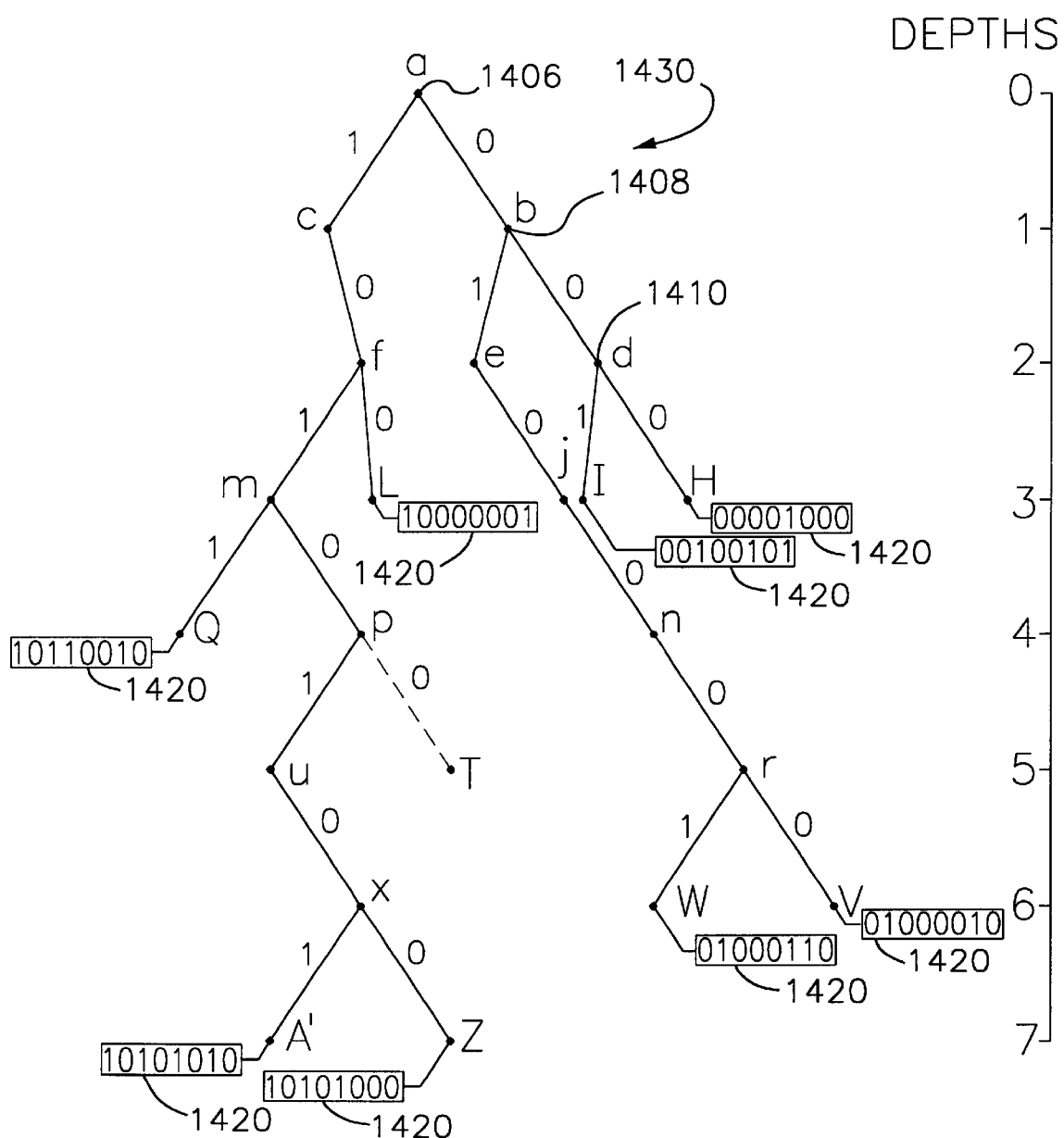
FIG. 2b is a conceptual illustration of a prior art 0-complete binary tree.

Refer now to FIG. 2b. A prior art 0-complete binary tree 1430 is shown having the same structure, nomenclature and reference numerals as used in FIG. 2a except where noted. Binary tree 1430 with δ leaves is said to be 0-complete if 1) the sibling of any 0-leaf is present in the tree, and 2) there are exactly δ-1 1-nodes in the tree. Thus, FIG. 2b is a 0-complete binary tree representation of the binary tree of FIG. 2a since every 0-leaf H, V, L, T, Z has a sibling 1-node, and there are nine leaves H, I, V, W, L, T, Z, A' and Q and eight 1-nodes I, W, e, c, m, A', U and Q. The 0-complete tree 1430 is derived from the binary tree 1402 of FIG. 2a by deleting from the tree 1402 those 1-leaves that are empty (indicated by the lack of an associated search key) such as leaves G, K, O, S and Y. Note that deletion of any empty 0-leaf violates the second condition which requires eight 1-nodes in tree 1430, so that node T, even though it is empty, remains in the tree storage structure 1430 and increases required storage space.

Each interior node, designated by small letters, has a corresponding 0-subtree and 1-subtree. The "pre-order traversal" of a 0-complete tree starts at the root node a of the tree and then iterates the following two steps until the last node has been accessed:

(1) if the current node $nn_i$ is an internal node then the next node $nn_{i+1}$ in the order will be its 0-son because, by definition of 0-completeness, every interior node must have a 0-son node;

(2) if the current node $nn_i$ is a leaf then the next node in the pre-order will be the 1-son of the node pp whose 0-subtree contains $nn_i$ and whose depth is maximal.

Thus, the first node in pre-order is the internal root node a. The next node is its 0-son node b, which is followed by 0-son nodes d and then leaf H. The next node in pre-order is the 1-son of the node d since H is a leaf node and the 0-subtree of node d contains H and its depth in the tree is maximal (i.e., depth of 2 as opposed to node b whose 0-subtree contains H and whose depth is 1). The complete pre-order traversal of tree 1430 depicted in FIG. 2b is the sequence a b d H I e j n r V W c f L m p T u x Z A' Q.

Successor nodes to each leaf node H, I, V, W, L, T, Z, A' except the last leaf node Q in the pre-order traversal of a 0-complete tree are also of special importance. These nodes, termed bounding nodes, are respectively I, e, W, c, m, u, A', Q in FIG. 2b. Since bounding nodes are defined in terms of the pre-order traversal, each leaf node, except the last one Q, has its own unique bounding node. In addition, from the previously stated definition of the pre-order traversal, every bounding node is a 1-node.

a) Key Intervals

"Discriminators" of a node and a bounding node can be used to establish a key interval that corresponds to each leaf in the 0-complete tree. The "discriminator" of a leaf node is a binary string of the same length as the search keys and whose high order, or left-most, bits are the binary bits of the concatenated arcs, or path, leading up to the leaf with all of the other right-most bits set to 0.

The "key interval" is formally defined to be the key range between the leaf discriminator (inclusively) and the discriminator of its bounding node (non-inclusively). The exception is again the last leaf (Q by way of example) in the pre-order traversal, whose upper bound of its key interval is always known in advance and consists of all one bits (i.e., 11111111).

In Table 1, the key intervals of each leaf node H, I, V, W, L, T, Z, A', Q of the 0-complete tree 1430 are listed in lexicographic order. Thus, for example, leaf V has a discriminator of 01000000 and its corresponding bounding node W has a discriminator 01000100; the key interval of leaf V, as shown in Table 1, is 01000000 (inclusive) to 01000100 (non-inclusive), or 01000000 to 01000011 inclusively.

By examining Table 1, knowledge of bounding node discriminators is sufficient to identify the appropriate key interval of any leaf and hence the corresponding data record with any given search key. By way of example using search key 01000010, a search procedure that examines the bounding discriminators of the tree in their pre-order traversal sequence will find the correct key interval for the search key when the first bounding discriminator greater than the search key 01000010 is found. The discriminator of the first bounding node I, 00100000, is less than the search key 01000010. The second bounding discriminator of bounding node e in pre-order, 01000000, is also less than the search key. The discriminator of the third bounding node W, 01000100, is greater and is the non-inclusive upper bound of the key interval for leaf V. The inclusive lower bound of the key interval for leaf V is the discriminator of the previous bounding node e.

Along with each key interval in Table 1, there is shown a number denoting the "depth" of the bounding node in the 0-complete tree 1430 for that key interval. For example, the bounding node of leaf V is the leaf W that has a depth of 6 in the 0-complete binary tree. For the last node Q, which has no bounding node by definition, the upper bound of its interval is set to 11111111 with an assigned depth of 0.

There is one apparent regularity in the relationship between discriminators of a set of bounding nodes and their depths. If the depth of a bounding node is dd, then by definition of a discriminator, the $dd^{th}$ bit of the corresponding discriminator is set to 1 with all subsequent lower order bits 0.

In Table 1 wherein the key length is eight bits, the initial dummy discriminator is 00000000 and the depth of the first bounding node I is three, the third bit of the first bounding node discriminator is 1 and all subsequent, low order bits are 0 to obtain the first bounding node discriminator 00100000; the depth of the second bounding node e is two, using the first bounding node discriminator, the second bit is set to 1 and all subsequent bits are set to 0 in order to obtain the second bounding node discriminator 01000000. The discriminators of the remainder of the bounding nodes are constructed in a similar manner.

3) Prior Art $C_0$-Trees

Figure 3A:
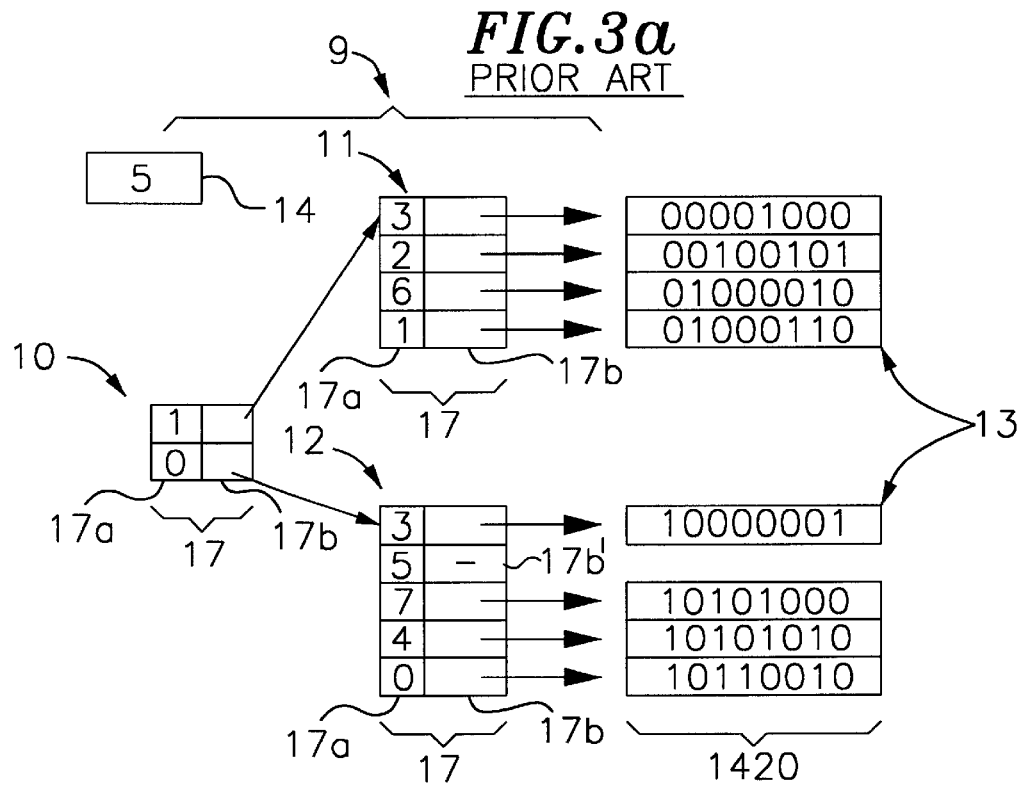
FIG. 3a is a diagram of a prior art $C_0$-tree index structure for values stored in a database.

Using the knowledge that key intervals can be constructed from depths of bounding nodes in a 0-complete binary tree, a prior art compact, form of the 0-complete tree of FIG. 2b is represented at 9 in FIG. 3a. This compact form is called a $C_0$-tree. The tree structure has index blocks 10, 11, and 12 with entries 17. When forming a $C_0$-tree, the maximum number of entries 17 in any one index block is always less than or equal to a predetermined full index block number 14. Assuming a predetermined full index block number 14 of five in FIG. 3a, consider now how the tree structure 9 represents the 0-complete binary tree of FIG. 2b. Each entry 17 of index blocks 11 and 12 has a depth value 17a and a pointer 17b to a storage location 13. The only exception would be a NIL entry, such as 17b', representing an empty leaf or node of FIG. 2b, such as leaf T. This entry 17b' has an empty pointer 17b with no corresponding data stored in memory and wastes storage space within the computer system.

By way of example in FIG. 3a with reference to Table 1, the depth values 3, 2, 6, 1, of bounding nodes I, e, W, c corresponding to leaves H, I, V, W are stored in index block 11. The depth values 3, 5, 7, 4 of bounding nodes m, u, A', Q corresponding to leaves L, T, Z, A' and the assigned depth value of 0 for the final leaf node Q are stored in index block 12. The pointer 17b of each entry 17 points to a storage location 13 corresponding to a search key and its associated data record in memory or the storage device, except empty pointer 17b of entry 17b' corresponding to empty leaf T of FIG. 2b. Root index block 10 has entries 17 with pointers 17b that point to a corresponding leaf index block 11 and 12. The depth value 17a of each entry 17 of index block 10 corresponds to the last or minimum depth value, 1 and 0, of each respective leaf index block 11 and 12 and provides the key interval range for each leaf index block 11 and 12.

Figure 3B:
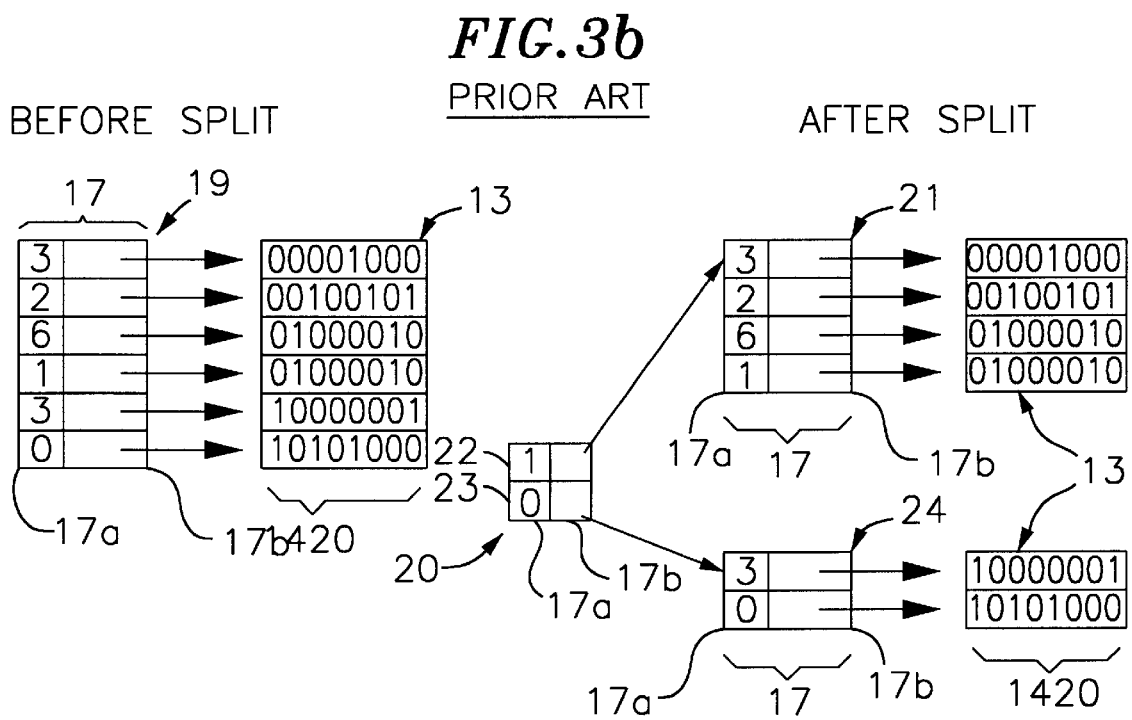
FIG. 3b is a diagram of the $C_0$-tree of FIG. 3a before splitting occurs.

Now consider the known method of splitting a full index block of a compact 0-complete tree as show in FIG. 3b, wherein the first six search keys have been indexed in the lexicographic order. At this point, the tree structure is a single index block 19 having six entries 17 which is a compact representation of a conceptual 0-complete binary tree having six leaf nodes indexing search keys 00001000, 00100101, 01000010, 01000110, 10000001, and 10101000. Once the sixth search key 10101000 in order is indexed, the predetermined full index block number 14 of five was exceeded, and a split of index block 19 must occur. The split occurs at the minimum depth of depth values 17a of index block 19, which is 1. This split creates a root index block 20, a leaf index block 21 having depth values 17a of 3,2,6 and 1 and a leaf index block 24 having depth values 17a of 3 and 0. After splitting, parent index block 20 is comprised of two entries 17. The first entry 22 has a depth value 17a of 1 corresponding to the bounding node depth of a leaf node indexing search key 01000010 in a conceptual binary 0-complete tree after input of the same six search keys, and the second entry 23 has a depth value 17a of 0 which is always the assigned value of the final leaf node in the pre-order of a 0-complete binary tree. The pointers 17b of entries 22 and 23 point to index blocks 21 and 24 respectively.

C) Compact 0-Complete Data Storage Structure.

1) Structure and Searching

Now, referencing FIG. 4a, a representation of the data storage structure 40 utilized in an embodiment of the present invention is depicted after the input of a set of search keys 1420. A greater number of search keys can be input into the data storage structure 40, and it would be within the skill of the practitioner in the art to apply the described embodiment to a greater set of keys. As opposed to the $C_0$-tree of FIG. 3a having blocks 10, 11 and 12 with adjacent depth value 17a and pointer 17b entries 17, the data storage structure of FIG. 4a has a tree structure 43 comprised of a root node 47 with an index block header 47a indexed to index block entries 47c and subtree pointer 47b, a node 34 with an index block header 34a linked to index block entries 34c and subtree pointer 34b, and node 35 with index block header 35a linked to index block entries 35c and subtree pointer 35b.

Each entry in 47c, 34c and 35c contains a depth value 89 and a data present indicator 90. In addition, the structure 40 has a separate pointers structure comprised of a pointers header 36 with corresponding entries 36a containing the pointers or referencable indices for the corresponding depth values 89 of leaf index block entries 34c and 35c that are non-NIL. The depth values 89 in 34c and 35c and the indices of pointer entries 36a are representative of the depth values 17a and pointers 17b in index blocks 11 and 12 of FIG. 3a, except that empty pointers corresponding to 0-leaf entries, thereby reducing wasted storage space. The index block entries 47c of node 47 includes entries 30 and 31, corresponding to the entries in index block 10 of FIG. 3a which give the last, i.e., minimum value depth entries in the corresponding index blocks of 34c and 35c, respectively. Pointer 47b of the root level 41 points to the leaf level 64 for key intervals corresponding to each of the index block entries 47c.

In addition to separation of the corresponding depth values 89 into index block entries 47c, 34c and 35c and pointer entries 36a, counts header 66 with corresponding entries 66a is related. Entries 66a contains count entries 32 and 33 that give the total number of F or full leaf (non-NIL) entries in index block entries 34c and 35c, respectively. Thus, count entry 32 has a value of 4 indicating there are 4 non-NIL 4 entries (or F values) in index block entries 34c. Count entry 33 has a value of 4 indicating there are 4 non-NIL entries (or F values) in index block entries 35c. Thus, the data storage structure 40 has a novel $C_0$-tree structure 43, a distinct pointers structure 36 and 36a, and a storage container 39. The nodes 34, 35 and 47 and the counts header 66 and counts entries 66a are in the tree structure 43 whereas the referencable indices or pointers are in the separate pointers structure comprised of header 36 and entries 36a.

The tree structure 43 in the FIG. 4 example has a height of two, root level 41 and leaf level 64. Index block entries 47c at root level 41 include two entries 30 and 31, and index block entries structures 34c and 35c at leaf level 64 include four entries 80, 81, 82, 83 and five entries 84, 85, 86, 87, 88, respectively. The height or number of levels of a $C_0$-tree storage structure varies depending on the number of data items and associated search keys to be indexed within the leaf entries of the tree structure 43 and on a predetermined full index block number 79 set within the file system. The described FIG. 4a example embodiment has a predetermined full index block number 79 of five.

Depth values 89 are located in index block entries 47c, 34c, 35c that are linked by index block headers 47a, 34a and 35a within the nodes 47, 34 and 35, respectively, of tree structure 43. Pointer entries 36a are linked to tree structure 43 by pointers header 36. Significantly, the data present indicator bit 90 is also in each of the index block entries 47c, 34c and 35c.

Each indicator bit 90 is in one of two conditions, F or T, represented by 0 and 1, respectively. In depth values 89 at the leaf level 64, a T or first condition, indicates that the corresponding entry is a NIL entry of the $C_0$-tree or empty node of a conceptual 0-complete binary tree. An F, or second condition, indicates the corresponding entry is associated with a corresponding data item in the storage device of the computer. Each of the non-NIL entries 80 to 84 and 86 to 88 has a corresponding data item within the storage container 39 of memory 8 of the computer which is addressed by means of one of the pointer entries 36a. A NIL or T entry such as 85 does not address any index entry in 36a or data item in the storage container 39. Each of the pointer entries 36a is a pointer or a referencable index to the corresponding lexically ordered data item, or alternatively to one of the search keys 1420 which is associated with the data item, stored within the storage device of the computer.

Consider the data storage structure of the compact 0-complete tree 40 with reference to its component data structures. FIG. 6a is an exemplary diagram of the structure of each node within a computer system. Node 34 is shown by way of example, the others being identical. Node 34 is composed of two structures. Each structure is comprised of a header to a list of entries 34c, but each structure may be an array or some other form of data structure. One structure has a map header 34a that points to a list of entries 34c, and the other is a compound subtree pointer 34b that points a list of elements which may be comprised of other lists.

Compound header C associated with each index block points to the next lower level, if any, of the tree structure 43. Thus, in FIG. 4a compound header 47b points to a subtree of child nodes 34 and 35 in a branch. Each branch may or may not contain a compound header that points to a lower level of the tree. When the compound header C is not empty, as in node 47, the node 47 is an INTERIOR or ROOT branch type node. At a leaf level of the tree structure, no child nodes or subtrees depend from the nodes and the respective compound headers are empty as depicted at nodes 34 and 35 where compound pointers 34b and 35b, respectively, do not point to another level of the tree. Compound headers give a subtree its structure by grouping together several pieces of related information. In an initial INIT type structure 40' as in FIG. 6b, before any non-NIL values have been added, the map header 47a' of node 47' points to an entry with a depth value 89' of 0 and an indicator bit 90' set to the first or NIL condition T, which indicates there is no corresponding data item for this entry in the storage container 39'.

The first element, for example 42 in FIG. 4a, of the compound structure is always empty at the root level, and is merely reserved so that the compound structure layout of the root level is similar to the various sub-levels of the tree and in the event a new root level needs to be created when the root index block 47a of node 47 becomes overfull, as when the number of entries 47c linked to root index block header 47a exceeds the predetermined full index block number 79 of five. The first element's 42 purpose in the deeper levels, other than the root level of the tree, is to be explained.

The fourth element at the root level 41 is the pointers header 36 pointing to a list of pointer entries 36a. The fifth element depicted in FIG. 4a is a storage container 39 in memory 8 or storage device 4 of the computer in which the actual data items of information are stored. Data items may be any form of data which can be stored by a computer system. Each of entries 36a corresponds to one of the index block entries 34c and 35c. Each entry in entries 36a contains a referencable index or a pointer to a data item in container 39.

The final two elements 36 and 39 are separate from the tree structure 43 and may be implemented in various distinct methods. For example, in contradistinction to the described embodiment in FIG. 4, the two elements may be placed in a distinct compound pointer structure, which is not physically adjacent to the tree structure 43.

The search keys 1420 and the data storage structure 40 are organized so the file system can simply and efficiently find requested items. As shown in FIG. 4b, storage container 39 contains data items, which are represented by search keys, in any order. A lexically ordered referencable index or pointer for each search key is placed in pointer entries 36a. Finally, each index or pointer addresses the location of a data item in container 39. A number of items to be inserted simultaneously are first sorted lexically within a buffer, then stored in any order into container 39. Storage of data values may be done by various methods known to one of ordinary skill in the art.

Returning to tree structure 43, in order to take advantage of the indicators 90, the first element 66 of the compound structure at any level, such as level 64, except the root level 41, is a counts header to counts entries 66a. Each of the counts entries 66a, such as entries 32 or 33, is a count of non-NIL leaf entries having an indicator 90 set to F in the corresponding index block entries 34c and 35c within the subtree level 64 connected to node 47 through compound header 47b. Since there are two nodes 34 and 35 at level 64 in FIG. 4, the counts structure contains exactly two entries 32 and 33. The first entry 32 corresponds to the count of index block entries 34c, and the second entry 33 corresponds to the count of index block entries 35c. Since the first index block entries 34c include four non-NIL or F entries 80, 81, 82, 83, the first entry 32 of the counter structure contains a count value of 4. Since the second index block entries 35c include four non-NIL entries 84, 86, 87, 88, the second entry 33 has a count value of 4. The non-NIL leaf entry count, such as entries 32 and 33, of each subtree of each level is incremented as each new non-NIL entry corresponding to a new data item is inserted into the corresponding index blocks and is decremented for each non-NIL entry deleted from the corresponding index block.

While performing operations on the data storage structure 40 and descending the tree structure 43 from the root level 41 down, access information to the pointer entries 36a in the form of a pointers index, ps, is kept of the non-NIL or F leaf entries in preceding subtrees through the accumulation of the values in the first element of each subtree level, such as counts header 66 and entries 66a of level 64. In order to derive the corresponding pointers index of a stored data item, the preceding count from previous subtree levels is added to the count of non-NIL entries processed in the current leaf index block up to the entry corresponding to the key interval of the present search key. This index ps corresponds to the data item's pointer position in the pointers entries 36a, which is also the data item's lexical position.

Now, with reference to FIGS. 4a and 4b, an example of how to determine the key interval range and data item of a search key is described. Further detail as to the steps to be performed in such a determination is described in U.S. Pat. No. 5,758,353 with reference to the program structure, particularly the Search Depths Procedure of FIG. 12. Assume a search is performed on the search key in binary form 10101000. The search key is represented by a sequence containing the ordinal value bit positions of the one bits in the search key, which starting from the left are values 1, 3, and 5. In addition, a final value is added after the last in the sequence and is a value representing the maximal key length in bits plus 1, which in this example is 9 since the key is one byte maximum. As a result, the sequence for search key 10101000 is 1, 3, 5 and 9. This search key sequence is compared to the depth values of the index blocks in the tree structure 43. First, the depth values 89 of index block entries 47c of root node 47 are compared to the elements of the search key sequence. A comparison of depth values 89 is iterated until an entry is found wherein the depth value is less than an ordinal value of the search key element of the sequence. In addition, an index to an entry in the current index block 47c and an index to the ordinal positions of the search key sequence element are maintained. The depth value of entry 30 is compared to the first ordinal element of the search key sequence. Since both are equal to 1, the index to the search key sequence element is incremented. Moreover, since the depth value is not less than the ordinal value, the index to the entries in the index block is incremented.

The depth value of the second entry 31 of index block 47c, 0, is compared to the second ordinal element of the sequence, 3. Since the two values are not equal and the depth value of entry 31 is less than ordinal value 3, i.e., (0<3), the search ends in this index block and, since this is a non-leaf node 47, the child index block corresponding to entry 31 is obtained and searched. In FIG. 4, this is index block structure 35a and 35c. In addition, a pointers index to the pointers entries 36a is incremented by the value stored in entry 32 of counts entries 66a. This pointers index contains the sum of preceding non-NIL entries (illustrated by the F entries) in index block entries 34c.

A count of non-NIL entries in the current leaf index block, initialized to one at the start of the search at any subtree level, of entries of 35c is maintained. Since the first entry 84 is non-NIL, the count of non-NIL entries is incremented by 1. The depth value of entry 84, which is 3, is compared to the second ordinal search value 3 of the search key sequence since the file system resumes search of the ordinal values of the sequence at the same location at which the search terminated in 47c of parent node 47. The depth value of entry 84, and the ordinal search key sequence element 3 are equal. Thus, the next entry 85 in 35c is accessed. In addition, since the ordinal value 3 equals the present bit position of the search key, the next ordinal value 5 of the search key sequence is obtained. Entry 85 is a NIL entry, so the count of non-NIL entries is not incremented. The depth value of entry 85 is then compared to the third ordinal value 5 of the search key sequence. Since the two are equal (5=5), the next entry 86 of index block entries 35c is obtained and the next element of the ordinal value sequence, 9, is obtained. Entry 86 is non-NIL, incrementing the count of non-NIL entries to two. In addition, the depth value 89 of entry 86 is compared to the ordinal value 9. Since the depth value 7 is less than the ordinal value 9 in the search key array (7<9), the search ends in this index block and, since this is a leaf node, the correct entry corresponding to leaf Z in FIG. 2b and Table 1 has been found.

At this point, the pointers index ps, which is equal to 4, is summed with 2 to result in 6. The 6 is used to select the sixth entry of pointers entries 36a which is an 8. This sixth entry is a referencable index to the eighth data item in storage container 39, which corresponds to search key 10101000 in binary form as shown in FIG. 4b.

The tree structure 43 and the search keys 1420, along with the entries 66a keeping count of the number of indicator bits at the leaf level set to F, are used to keep an index to the pointers entries 36*a*. The pointers entries 36*a* then comprises an index to the items stored in the storage container 39.

Moreover, since the pointers header 36 and pointer entries 36*a* are distinct from the remainder of the tree structure 43 and store referencable indices to the keys 1420 in lexicographic order, a search key or data item can be accessed in its lexical order without using the tree structure 43 at all. By knowing the lexical position of the data item to be located, the data item 13, 22 can be located by accessing the entries 36*a* alone.

Figure 5:
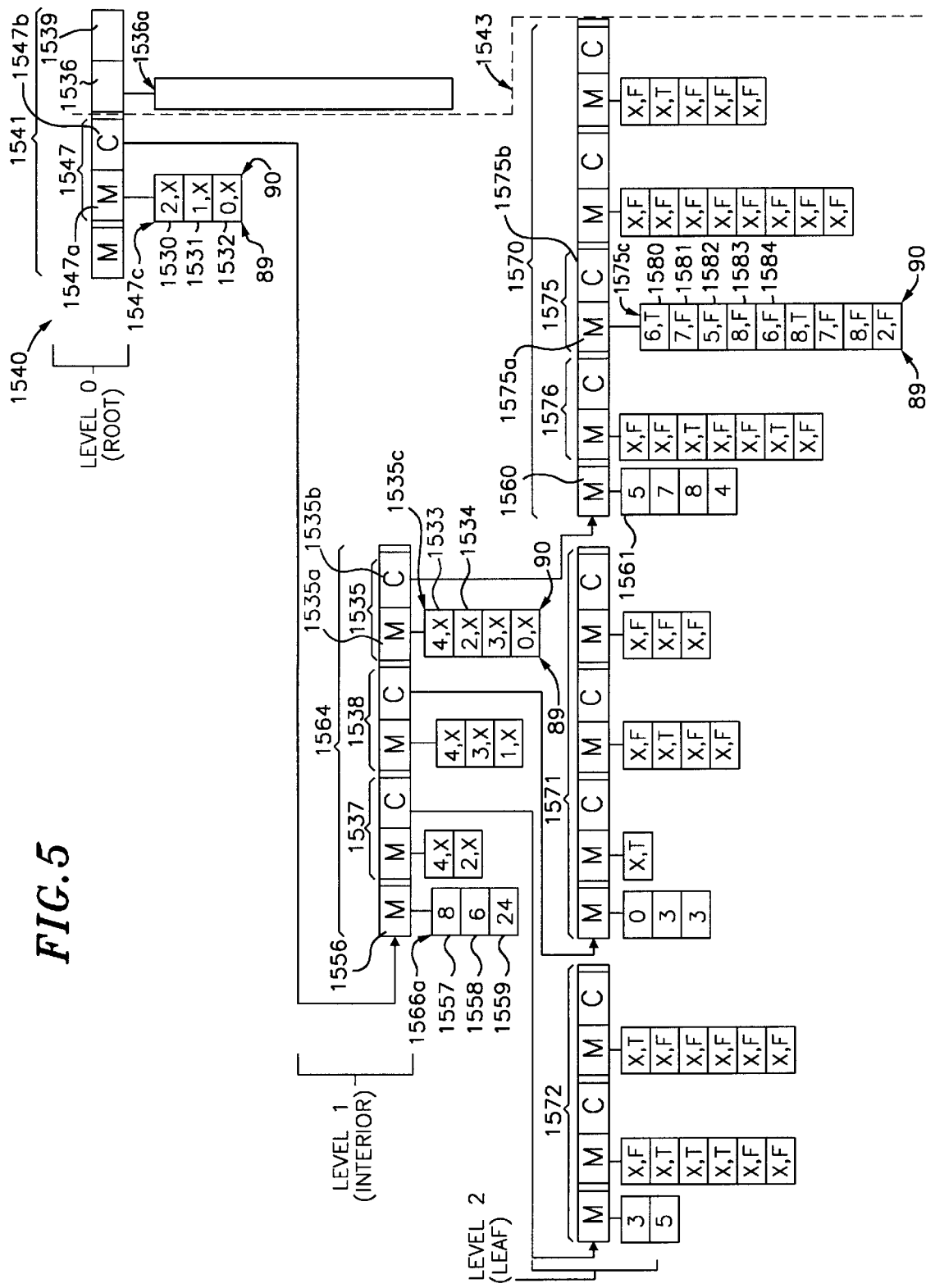
FIG. 5 illustrates an exemplary three level embodiment of a $C_0$-tree used in conjunction with to the present invention.

To further describe the structure of the $C_O$-tree utilized with the present invention, an example of how to determine the key interval range and data item of a search key of a $C_O$-tree that is comprised of more than two levels is described with reference to FIG. 5 and Table 2. The data storage structure 1540 is comprised of three levels: ROOT level, INTERIOR level, and LEAF level. Certain items of information within structure 1540 that do not pertain to this example have not been depicted in FIG. 5 and have been replaced with the letter X. The non-NIL indicators for the root and interior index blocks also may be represented by the letter X as the non-NIL indicators only have meaning for leaf index blocks. Thus, index block entries of ROOT level 1541 and INTERIOR level 1564 have an X depicting the present indicator bit since the indicator bit only indicates the presence of a corresponding data item at a LEAF level structures, such as 1570. Moreover, the depth values of each of the index block entries at the LEAF level, other than entries 1575*c*, are shown as an X since they are not utilized by the present search example. Finally, the contents of pointers entries 1536*a* and storage container 1539 have not been specifically described as they are not necessary to the present example.

Assume a search is performed on the search key 10011001 as shown in Table 2. The search key is represented by a sequence b[k] containing the ordinal value bit positions of the one bits in the search key, which starting from the left are 1, 4, 5 and 8. As in the previous example described, a final value, 9, is added after the last in the sequence. Therefore, the sequence is b[k]=<1, 4, 5, 8, 9>. First, the depth values 89 of index entries 1547*c* of root node 1547 are compared to the elements of the search key sequence. An index j to the index block entries 1547 is maintained, and an index k to the ordinal position of the search key sequence is maintained. At Step 1 of Table 2, the depth value d[j] of entry 1530 is compared to the first ordinal element b[k] of the search key sequence, which is equal to 1. Since the depth value d[j] is greater than the ordinal element b[k], the index j to the index block entries 1547*c* is incremented.

At Step 2 of Table 2, the depth value d[j] of the second entry 1531 of index block entries 1547*c* is compared to the first ordinal element b[k]. Since they are equal, the index k to the search key sequence is incremented. Then, the index j to the index block entries 1547*c* is incremented.

Since j=3 and k=2 at Step 3, the depth value d[j] of the third entry 1532 is compared to the second ordinal element b[k]. Since the two values are not equal and the depth values d[j] of entry 1532 is less than ordinal value b[k] (i.e., 0<4), the search ends in this index block headed by 1547*a*. Since this is a non-leaf node 1547, the child node and index block corresponding to entry 1532 are obtained and searched. In FIG. 5, this is node 1535 with subtree 1570, index block header 1535*a* and entries 1535*c*. In addition, the terminating key bit position bK is set to the presently indexed ordinal value b[k] (i.e. bK=4) in order that the computer system may easily and efficiently resume the search procedure at the child index block.

In addition, as shown in Step 4 of Table 2, a pointer index ps to the pointers structure 1536 is incremented by the values S stored in entries 1557 and 1558 of counts header 1556 of INTERIOR level 1564 since these entries precede the third entry which is the subtree to be searched. This pointers index ps contains the sum of preceding non-NIL entries (illustrated by the F indicator entries) in the previous siblings of this node 1535. Thus, entry 1557 corresponds to non-NIL leaf entries depending from the compound header C of node 1537 and entry 1558 corresponds to the non-NIL leaf entries depending from the compound header C of node 1538. The pointers index ps is therefore presently equal to fourteen, since eight non-NIL leaf entries depend from node 1537 and six non-NIL leaf entries depend from node 1538.

At Step 5 of Table 2, the index variable j is initialized to one. The first depth value 1533 d[j] of entries 1535*c* is compared to the second ordinal search value b[k]. (The second ordinal value, which equals four, is used since the computer system obtains the ordinal element in the search key sequence greater than or equal to the terminating key bit position, bK, which was set to four when search of the parent node 1547 ended.) Since d[j] equals b[k], the index k to the search key sequence is incremented. Then, the index j to the entries 1535*c* is incremented.

At Step 6, the depth value d[j] of the second entry 1534 of index block entries 1535*c* is then compared to the third ordinal element b[K], which is equal to five. Since the depth value d[j] is less than the ordinal element b[K], (i.e., 2<5), the search ends in this index block headed by 1535*a*. Since node 1535 is an INTERIOR node, the child node and index block corresponding to entry 1534 is obtained. In FIG. 5, this is node 1575. The terminating key bit position bK is set to the presently indexed ordinal value b[k] (i.e., bK=5). Then the pointer index ps is updated at Step 7 to additionally contain the number of non-NIL entries in previous siblings of node 1575. Since at a LEAF level each count entry, such as entry 1561 linked to count header 1560, corresponds to the number of non-NIL entries in a respective node in a LEAF structure 1570, the first counts entry 1561 corresponds to the number of non-NIL entries in the first node 1576 of structure 1570. The pointer index ps is therefore equal to nineteen, its previous value fourteen plus the value found in counts entry 1561, five. The index variable j is reset to one.

A count index c of non-NIL entries, initialized to zero at the start of the search of entries 1575*c*, is maintained. Since the ordinal element b[k] is less than the depth value d[j] of entry 1580 of index block entries 1575*c* at Step 8, the index j to the entries 1575*c* is incremented. An index c to the entries 1575*c* is not incremented since entry ej 1580 is a NIL entry. At Step 9, the ordinal element is again less than the depth value d[j] of entry 1581. Thus, index j is incremented. The index c is incremented since entry ej 1581 is a non-NIL entry. The depth value d[j] of the non-NIL entry 1582 is equal to the present ordinal element b[k] in Step 10. Therefore, index k is also incremented.

In Step 11, the depth value d[j] of the fourth non-NIL entry 1583 is compared to the third ordinal element b[K]. Again, the values are equal (i.e., 8=8). Indices k, j and c are incremented. Finally, the depth value d[j] of the fifth entry 1584 is compared to the fourth ordinal element b[k]. The depth value d[j] is less than the ordinal element b[k] (i.e., 6<9) and, since the LEAF level is presently being searched, the correct entry corresponding to search key 10011001 has been found.

At this point, the pointers index ps is incremented by the counts index c (i.e., 19+4=23) at Step 13. This provides the total of non-NIL entries previous to and including entry 1584. The 23 is used to select the twenty-third entry in the pointers entries 1536a which contains the referencable index, or pointer, to the correct data item in storage container 1539.

2) Alternative Representation of Structure

Figure 6:
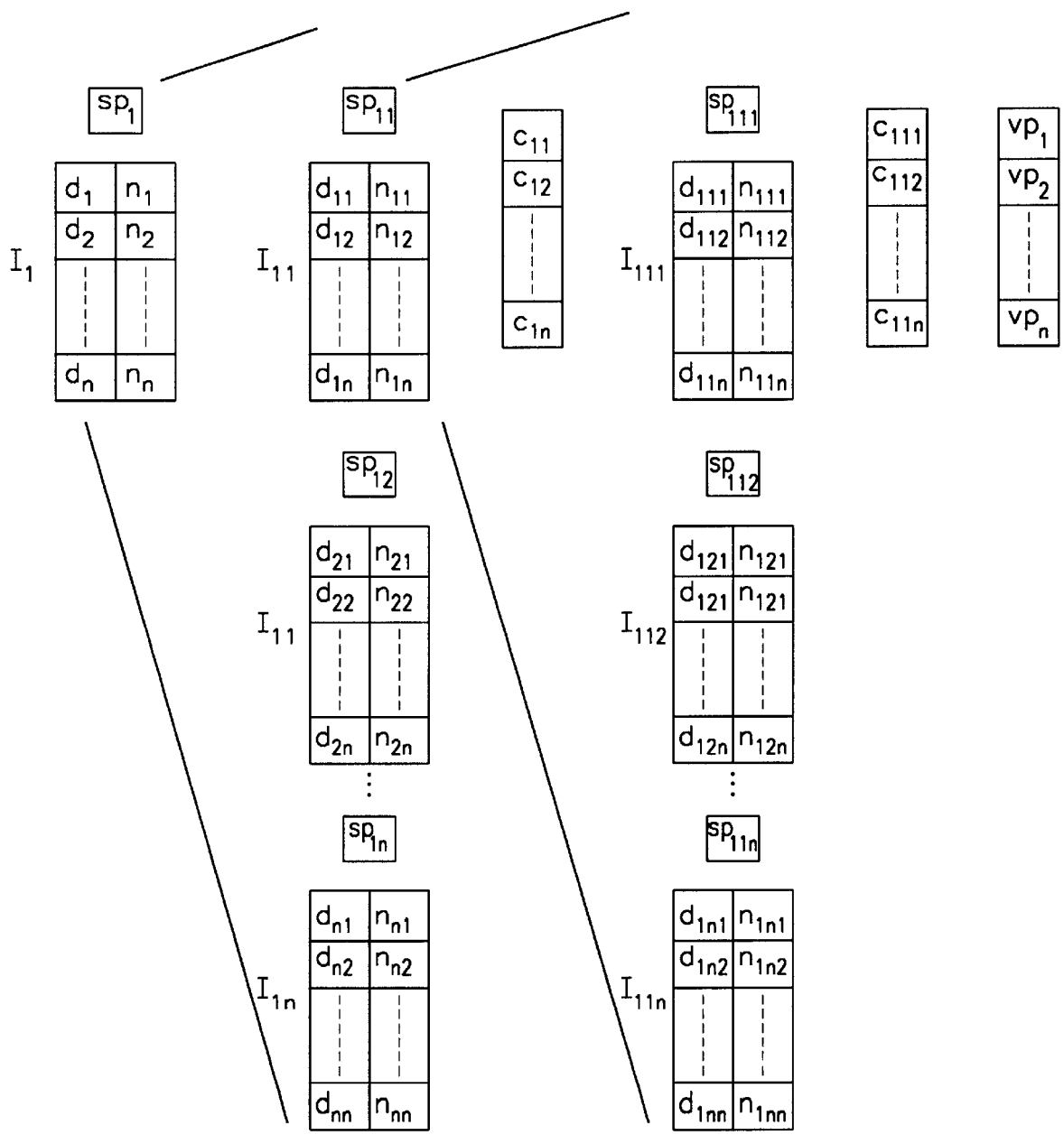
FIG. 6 illustrates an alternative representation of a data structure utilized with the present invention.

An alternative representation of a data structure utilized with the present invention is illustrated in FIG. 6. The structure comprises a root index block $I_1$, interior index blocks $I_{11}$, $I_{12}$, ..., and $I_{1n}$ forming a first subtree and leaf index blocks $I_{111}$, $I_{112}$, ..., and $I_{11n}$ forming a second subtree. The leaf index block $I_{111}$, $I_{112}$, ..., and $I_{11N}$ are linked with the interior index block $I_{11}$. For simplicity of description, the leaf index blocks (and any additional intervening interior index blocks) associated with interior index blocks $I_{12}$ ..., and $I_{1n}$ are not illustrated.

Each root and interior index block is a parent index block and includes a subtree pointer SP. The subtree pointer SP points to a subtree of child index blocks, which is comprised of the same number of index blocks as the parent index block has entries. Thus, as illustrated in FIG. 6, the subtree pointer $SP_1$ of index block $I_1$ points to a subtree 1 containing index blocks $I_{11}$, $I_{12}$, ..., and $I_{1n}$. Similarly, the subtree pointer $SP_{11}$ of index block $I_{11}$ points to a subtree containing index blocks $I_{111}$, $I_{112}$, ..., and $I_{11n}$.

Each index block comprises, in addition to the subtree pointer, a number of entries. Each entry comprises a depth entry d, which represents the depth of a bounding node, and a NIL indicator n, which is the data present indicator, and has no meaning except in a leaf index block. The depth entry and the data present indicator are of a previously described subtree pointed to by any subtree pointer has the same number of index blocks as the index block with which the subtree pointer is associated has entries. Thus, the first subtree contains n index blocks as index block $I_1$ has n entries. Similarly, the second subtree also contains n index blocks as the first subtree has n entries.

Also associated with each subtree are a number of non-NIL counters C, with a non-NIL counter for each index block other than the root index block. The non-NIL counters provide an indication of the number of non-NIL entries of each corresponding index block, including any subtrees if the index block is an interior index block. As illustrated in FIG. 6, non-NIL counter $C_{11}$ indicates the number of non-NIL entries in the index blocks of the second subtree, which is comprised solely of leaf index blocks. Similarly, the number of non-NIL entries prior to index block $I_{11n}$ is equal to $C_{111}+C_{112}+ \ldots +C_{11-n}$. As a further example, assume that subtree pointer $SP_{22}$ points to a third subtree (not illustrated), and that the third subtree contains n leaf type index blocks. The number of non-NIL entries prior to the nth index block of the third subtree is equal to $C_{11}+C_{121}+C_{122}+ \ldots +C_{12n-1}$.

Associated with each non-NIL entry of the leaf index blocks is a value pointer VP. The value pointer points to a value V stored in a value area of memory. The value pointers are in lexical order of the value of the key such that a first value pointer is associated with a first non-NIL entry of a first leaf type index block, a second value pointer is associated with a second non-NIL entry of the first leaf type index block, and so on. Thus, if the position of a value pointer in the lexical order, the position therefore being the lexical value, is known it is possible to locate the index block containing the associated entry using the non-NIL counter C values, and to locate the specified associated entry in the index block by thereafter examining the non-NIL indicators of the entries in the index block containing the associated entry.

3) Bulk Deletion of Keys

Figure 7:
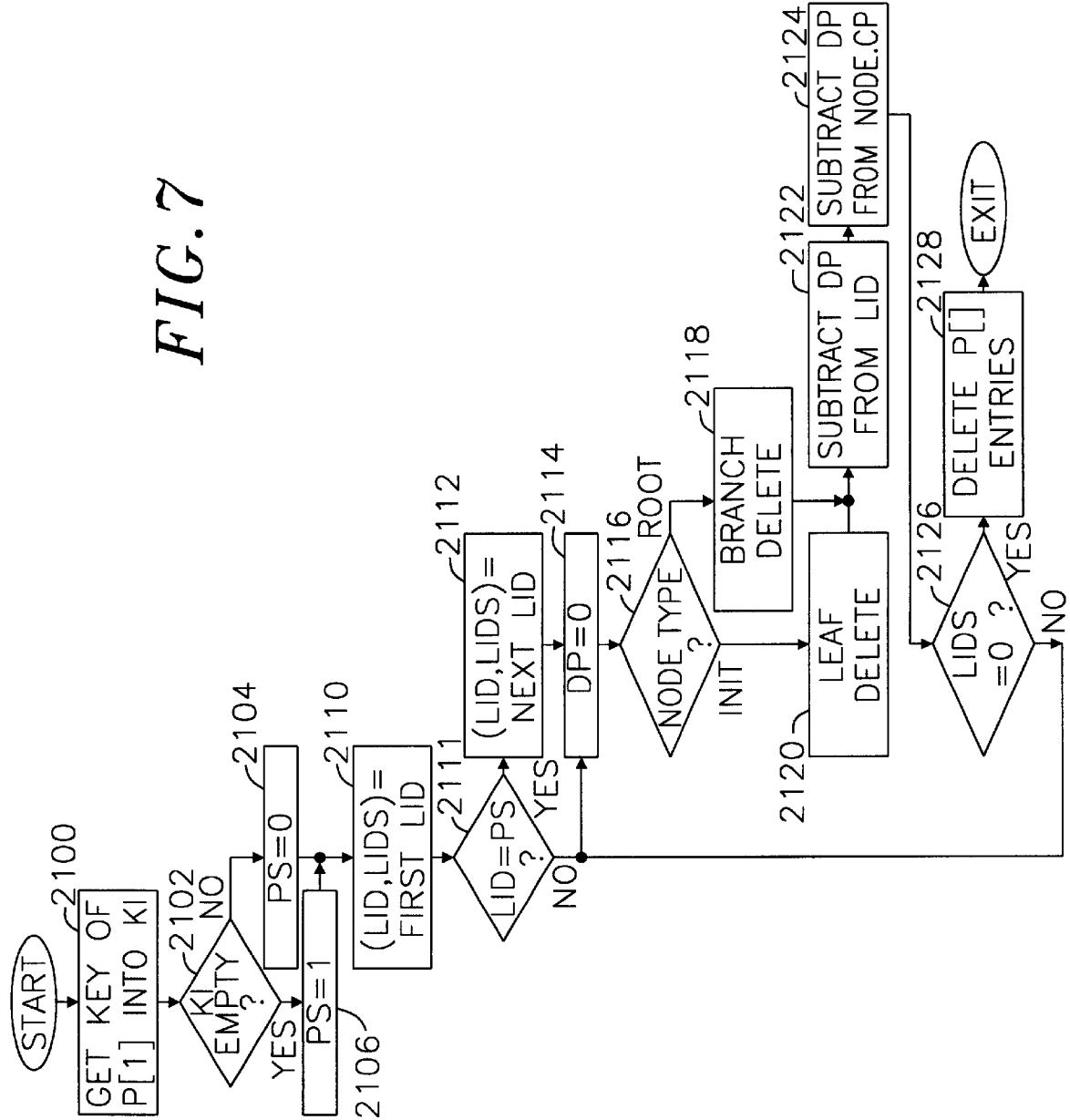
FIG. 7 illustrates a flow chart of a top level of a bulk delete process of the present invention.

The foregoing describes, in various representations, the format of the data structure used in conjunction with a deletion process of the present invention. A top level flow diagram of a bulk delete process for deleting nodes of the data structure is illustrated in FIG. 7. The bulk delete process deletes search keys from the data structure without examining search keys within the structure. Instead, the bulk delete process is provided a list of lexical identifiers identifying where, in a lexical order of key values associated with value pointers pointing to values, search keys which should be deleted are located. Thus, the bulk delete procedure is provided a list of lexical identifiers (LIDs), in lexical order, of entries to be deleted.

The process traverses the data structure tree from the root node to index blocks containing leaf nodes with entries corresponding to keys to be deleted, making use of the non-NIL counter values by which the process need not examine the contents of the index blocks of each branch of the data structure tree, but instead proceeds directly from the root to a first index block containing the entries corresponding to the keys requested, by lexical position and in lexical order, for deletion. Once at a leaf index block, the process deletes all of the entries corresponding to the keys in the index block requested for deletion.

The process then traverses back up the data structure tree towards the root node only so far as necessary, updating similar non-NIL counters and information as needed. The process then traverses back down to a subsequent index block containing keys requested for deletion. All entries corresponding to the keys requested for deletion in a subsequent index block are then deleted by the process. Thus, the process need not traverse the tree from the root node to delete the entries corresponding to the key requested for deletion, or even traverse the tree from the root node to delete ranges of entries corresponding to the keys.

As illustrated in the flow diagram of FIG. 7, the process first determines if the stored values include an empty string value entry. An empty string value entry is not stored as part of the data structure representing the conceptual $C_0$-tree. Instead, if an empty string value entry is required then an empty string value entry is pointed to by the first value pointer since it is lexically always first. Accordingly, the process fetches a stored key associated with the first entry of pointers entries in Step 2100. In Step 2102 the stored key is checked to see if the stored key is an empty string value. If the stored key is an empty string value, an initial index ps to the pointer entries that is a sum of non-NIL entries in the tree structure is set to one in Step 2106. Otherwise the index ps is set to zero in Step 2104.

In Step 2110 the process determines the lexical position of the first entry requested for deletion (first LID) in the lexical list of entries requested for deletion (list of LIDs). In Step 2111 the process determines if the first LID correlates to the first non-NIL entry in the structure. If true, then the process ignores the first LID and begins processing with the second LID in the list of LIDs by selecting the second LID in Step 2112.

In Step 2114 the process initializes a dp variable to zero. The dp variable indicates the number of entries deleted during a pass through the tree from root to leaf until the process returns to the ROOT. The process then determines a node type of the current node in Step 2116. If the current node is a ROOT node then the process causes execution of a branch delete process in Step 2118. If the current node is an INIT node then the process causes execution of a leaf delete process in Step 2120. The leaf delete process examines an index block and deletes items as appropriate. The branch delete process recursively examines nodes until a subtree containing the requested LID is found, whereupon the branch delete process call the leaf delete process. Once the leaf delete process is performed the branch delete process collapses the data tree structure as required.

After execution of either the leaf delete process or the branch delete process when processing resumes at the ROOT, the process adjusts the LIDs remaining in the list of LIDs by the number of entries deleted during the leaf and/or branch delete process in Step 2122. Similarly, in Step 2124 the process adjusts the non-NIL counter C for the index block processed during the leaf or branch delete process by the number of entries deleted.

The process then determines in Step 2226 if any LIDs remain in the list. If LIDs remain in the list the process returns to Step 2114, reinitializes the dp variable, and processes another section of the $C_0$-tree. Otherwise the process deletes the value pointers associated with all the requested LIDs in Step 2128 and thereafter exits.

a) Branch Delete

In order to delete entries it is first necessary to locate an index block or subtree containing entries requested for deletion. This is accomplished by examining the non-NIL counters for each entry until an index block within which an entry requested for deletion is located. If the index block so located is an interior index block then the index blocks stemming from the index blocks so located are similarly examined. This occurs until a leaf index block containing entries requested for deletion are located, whereupon the corresponding entries are deleted as appropriate and the data structure reorganized.

Figure 8:
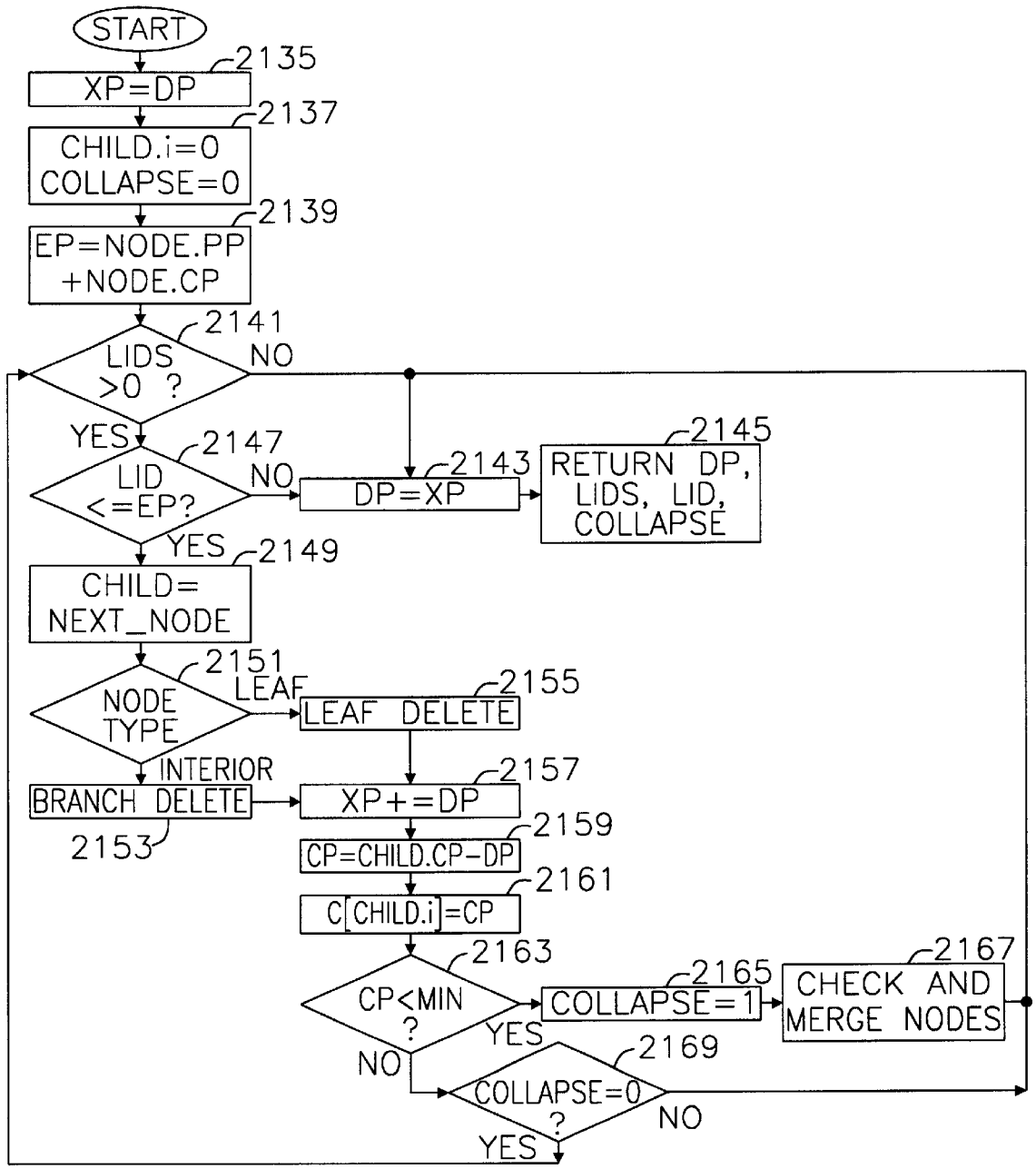
FIG. 8 illustrates a flow diagram of a branch delete process of the present invention.

A flowchart of a branch delete process which, along with the branch delete process' subprocesses, performs the foregoing procedure is illustrated in FIG. 8. The process initializes an index variable xp indicating the current location in the data structure in Step 2135. In Step 2137 the process initializes an index to the current index block to zero and a collapse flag to false. In Step 2139 the process sets an ep parameter variable equal to the number of non-NIL entries in the previous index blocks plus the number of non-NIL entries that occur in the current block. In Step 2141 the process determines if further entries are to be deleted. If no further entries are to be deleted the process performs the exit Steps 2143 and 2145 in which the variable indicating the number of non-NIL entries to that point in the data structure is updated and returned, along with the value of the collapse flag. If further entries are to be deleted, the process determines in Step 2147 if any entries requested for deletion are within the range of counts for the current index block. If the entries to be deleted are outside of the range of counts for the current index block, then the process executes the exit steps. If further entries are to be deleted between the range of counts for the current index block then the process executes the next node process in Step 2149. The next node process locates an index block out of a subtree of the current index blocks containing the entries requested for deletion.

The branch delete process continues at Step 2151 by examining the type of node located by the next node process. If the type of node is an interior node then the branch delete process recursively calls itself in Step 2153. This recursive operation will continue until either an exit condition is reached, which causes execution of the exit steps, or a leaf index block containing entries to be deleted is encountered. Once the next node process locates a node of node type leaf, then the process executes the leaf delete process.

Upon completion of the leaf delete process in Step 2155 the branch delete process updates the index variable xp by incrementing it by the dp variable indicating the end of the current index block. The process then sets the variable cp indicating the number of non-NIL entries in the current index block equal to the number of non-NIL entries prior to performing the leaf delete process minus the number of entries deleted. In Step 2161 the process sets a C[child.i] equal to cp. In Step 2163 the process then determines if the number of non-NIL entries in the current index block is below a predefined minimum. If the number of non-NIL entries is not below a predefined minimum then the process examines the collapse flag in Step 2169. If the collapse flag is equal to false then the process returns to Step 2141, otherwise the process executes the exit steps. If the process determines that the number of non-NIL entries in the Index block is not below the predefined minimum 2163 then the process that sets the collapse flag to true in Step 2165 and executes the check and merge nodes procedure in Step 2167. Thereafter, processing executes the exit steps.

b) Next Node

Figure 9:
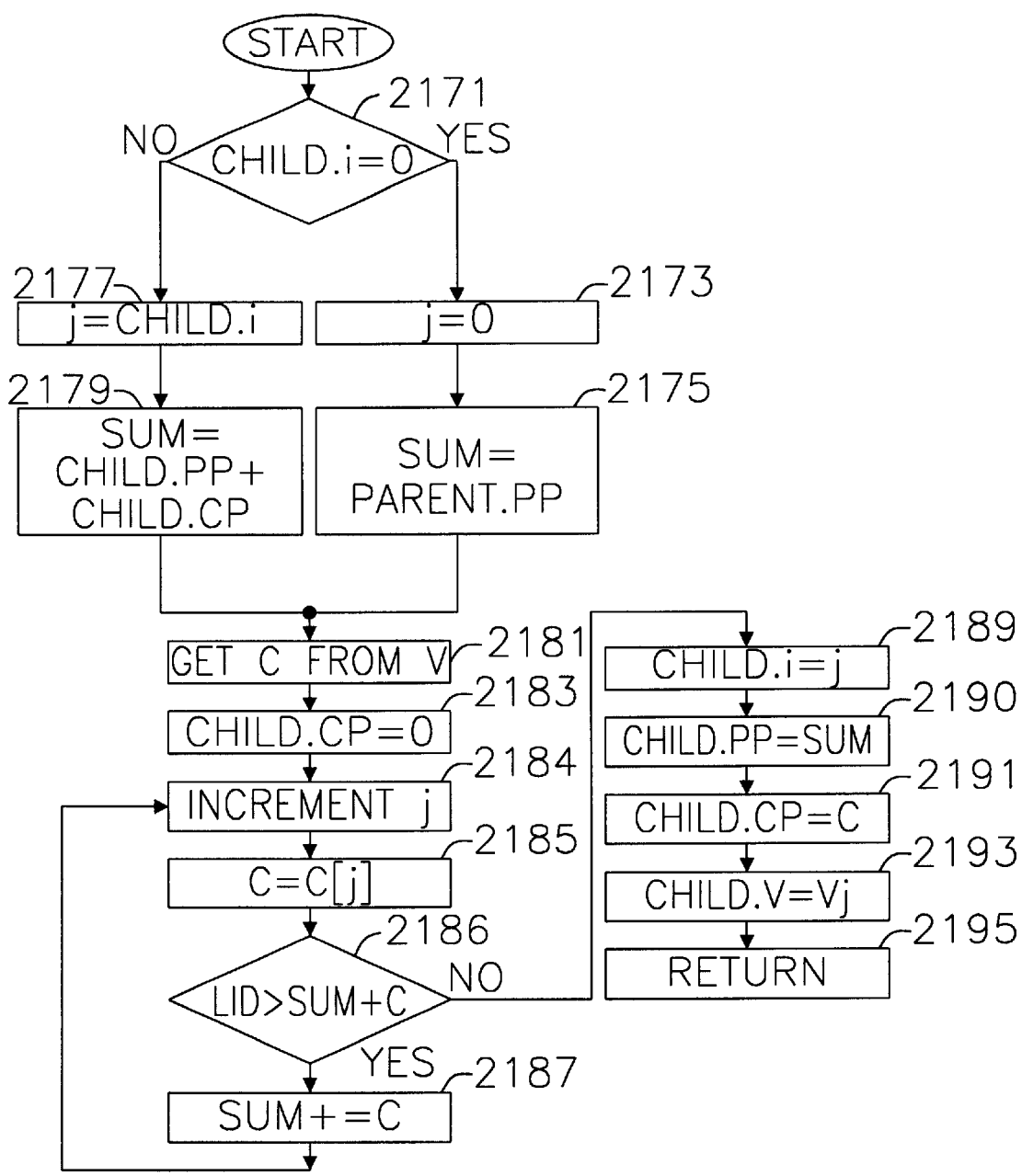
FIG. 9 illustrates a flow diagram of a next node process of the present invention.

A flowchart of the next node process is illustrated in FIG. 9. As illustrated in FIG. 9, the process first determines if no index blocks have yet been examined in Step 2171. If no index blocks have yet been examined then the process initializes an index variable j indicating the index block under examination to zero in Step 2173 and sets a variable indicating the number of non-NIL entries prior to the index block under examination's first entry in Step 2175. If prior index blocks have already been examined, then the process sets the current index block variable j equal to the current index block variable j equal to the current index block in Step 2177 and sets the sum variable equal to the number of non-NIL entries prior to the current block plus the number of non-NIL entries within the current block to resume processing in the current subtree.

Regardless of whether prior index blocks have been examined, the process obtains contextual information referencing the counts for subtrees at this level in Step 2181. In Step 2183 the process sets the variable indicating the number of non-NIL entries in the current index block to zero. In Step 2184 the process increments the index variable j to advance to the next index block. In Step 2185 the process retrieves the number of non-NIL entries in the jth index block. In Step 2186 the process compares the lexical position of the entry requested for deletion to the total number of non-NIL entries in previously examined subtrees plus the number of non-NIL entries in the current index block. If the next item requested for deletion is greater than the sum of the previously examined non-NIL entries in the prior current block plus the number of non-NIL entries in the current index block the process increments the number of previously examined non-NIL entries by the value of the number of non-NIL entries for the current index block in Step 2187, and thereafter returns to Step 2184. If the process determines that the next item requested for deletion resides within the current block or subtree in Step 2186, the process sets the variable child.i indicating the current index block to the value of the temporary variable whose value equals the index to the current index block in Step 2189. In Step 2190 the process sets the child.pp variable indicating the number of non-NIL entries prior to the current index block equal to the temporary sum variable. In Step 2191 the process sets a child.cp variable indicating the number of non-NIL entries in the current index block equal to the temporary variable indicating the number non-NILs in the current index block. The process then sets the child.V equal to Vj in Step 2193 so subsequent processing will examine that subtree containing the item requested. The process then returns in Step 2195 to the calling procedure.

c) Leaf Delete

Figure 10:
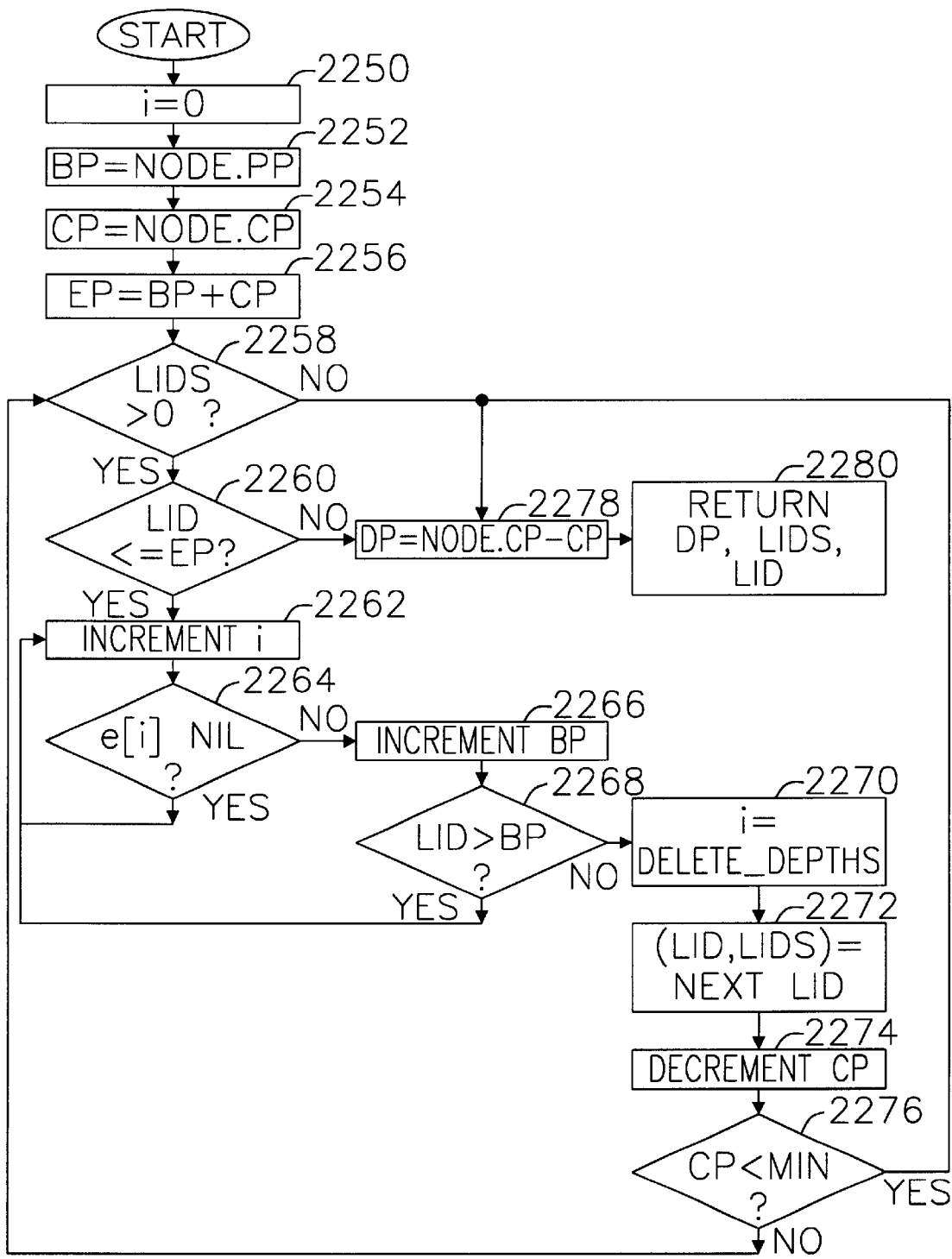
FIG. 10 illustrates a flow diagram of a leaf delete process of the present invention.

A flow chart of the leaf delete procedure is illustrated in FIG. 10. In Step 2250 the process initializes a counter i to zero. In Step 2252 the process initializes a prior blocks count pointer bp to the count accumulated for previous nodes prior to the index block under examination. The counter bp, therefore, indicates the lexical position of the first entry in the index block under examination. In Step 2254 the process initializes a current block pointer cp to the number of non-NIL entries in the current index block under examination. The process then determines in Step 2256 an end of index block variable ep by setting ep to the sum of the counts of prior index blocks counter bp and the current index block counter cp.

After the foregoing initialization process is completed the process checks to see if items remain to be deleted in Step 2258. If no items remain to be deleted the process executes exit steps later described. If any LID items remain to be deleted then the process determines if the next LID to be deleted is within the current block by comparing the next LID value with the end of index block variable ep in Step 2260. If the LID requested is not within the current index block the process executes the exit steps. If the LID is within the current block the process then increments the counter i in Step 2262 and examines the data present indicator for the entry in the block in Step 2264. If the data present indicator for ith entry in the block indicates NIL then the process returns to Step 2262. If the data present indicator for the ith entry in the block indicates data is available then the process increments the current lexical position variable bp in Step 2266 and determines if the current lexical position variable bp is equal to the requested LID value in Step 2268. If the current lexical position variable bp is not equal to the LID value the process returns to Step 2262. Thus, the process sequentially examines the data present indicator for entries in the index block in order to determine the lexical position of the entries until the entry requested for deletion is located.

Once the current lexical position is equal to the lexical position of the entry requested for deletion the process calls the delete depths process in Step 2270 which returns an i value. The process then gets the next LID to be deleted in Step 2272 and decrements the current block non-NIL entries variable cp to take into account the deleted entries in Step 2274. The process then determines whether the size of the index block has reached a minimum size beyond which further deletions need not occur in Step 2276. If the block has not reached the minimum size the process returns to Step 2258 and continues to search for items to delete within the block. If, however, the block has reached the minimum size the process executes the exit steps.

The exit steps, therefore, are executed if no entries remain to be deleted, if the next item to be deleted is not within the current block, or if the block has reached a minimum size. The exit steps merely comprise setting the dp variable, indicating the number of variable deleted in the pass through the index block. This is accomplished by setting the dp variable to the number of non-NIL nodes in the block at entry to the process minus the current block non-NIL entries value cp in Step 2278. The process then returns in Step 2280, and in doing so passes the dp variable to the calling routine.

d) Delete Depths

Figure 11A:
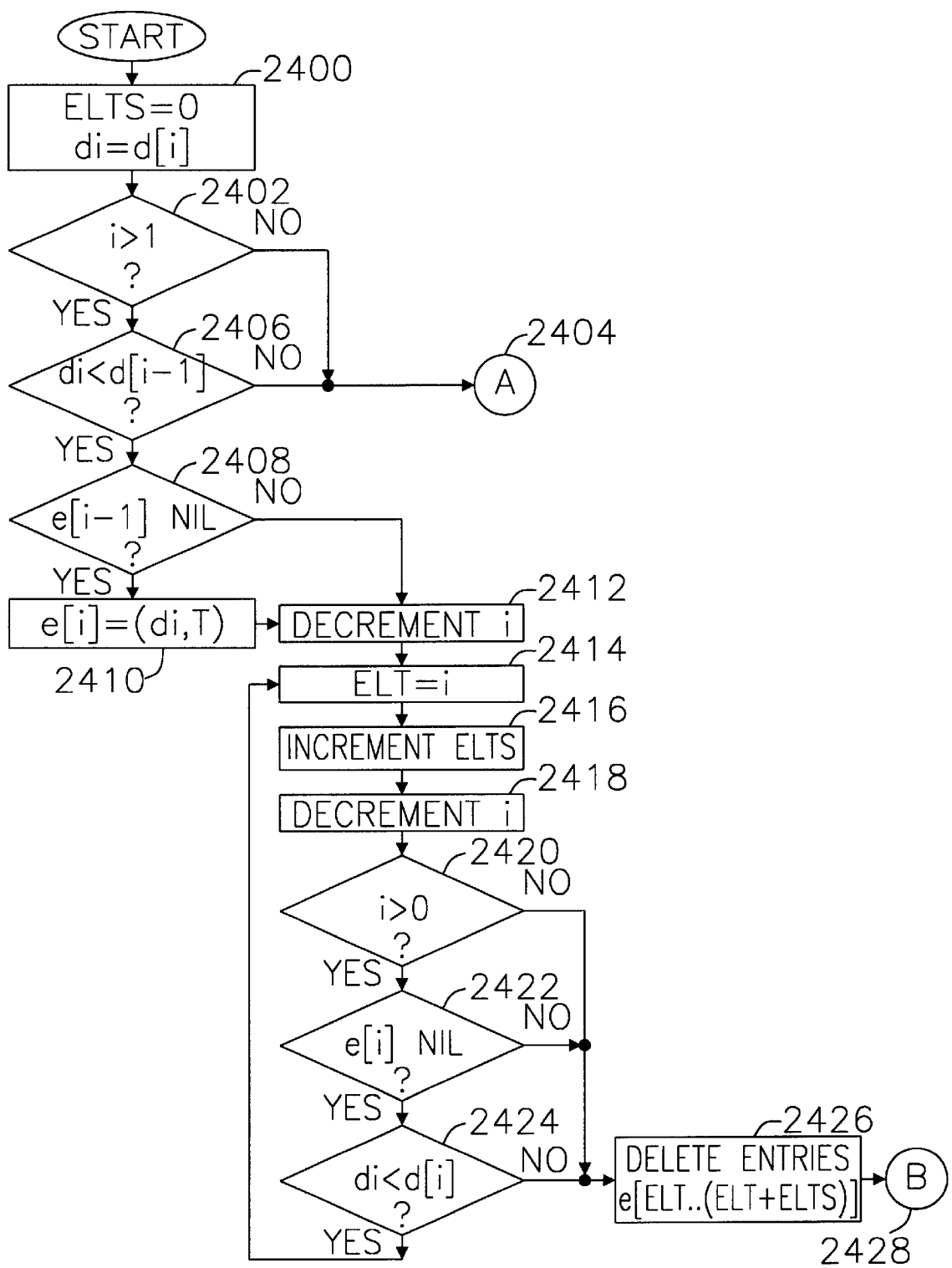
FIGS. 11a and 11b illustrate a flow diagram of a delete depths process of the present invention.
Figure 11B:
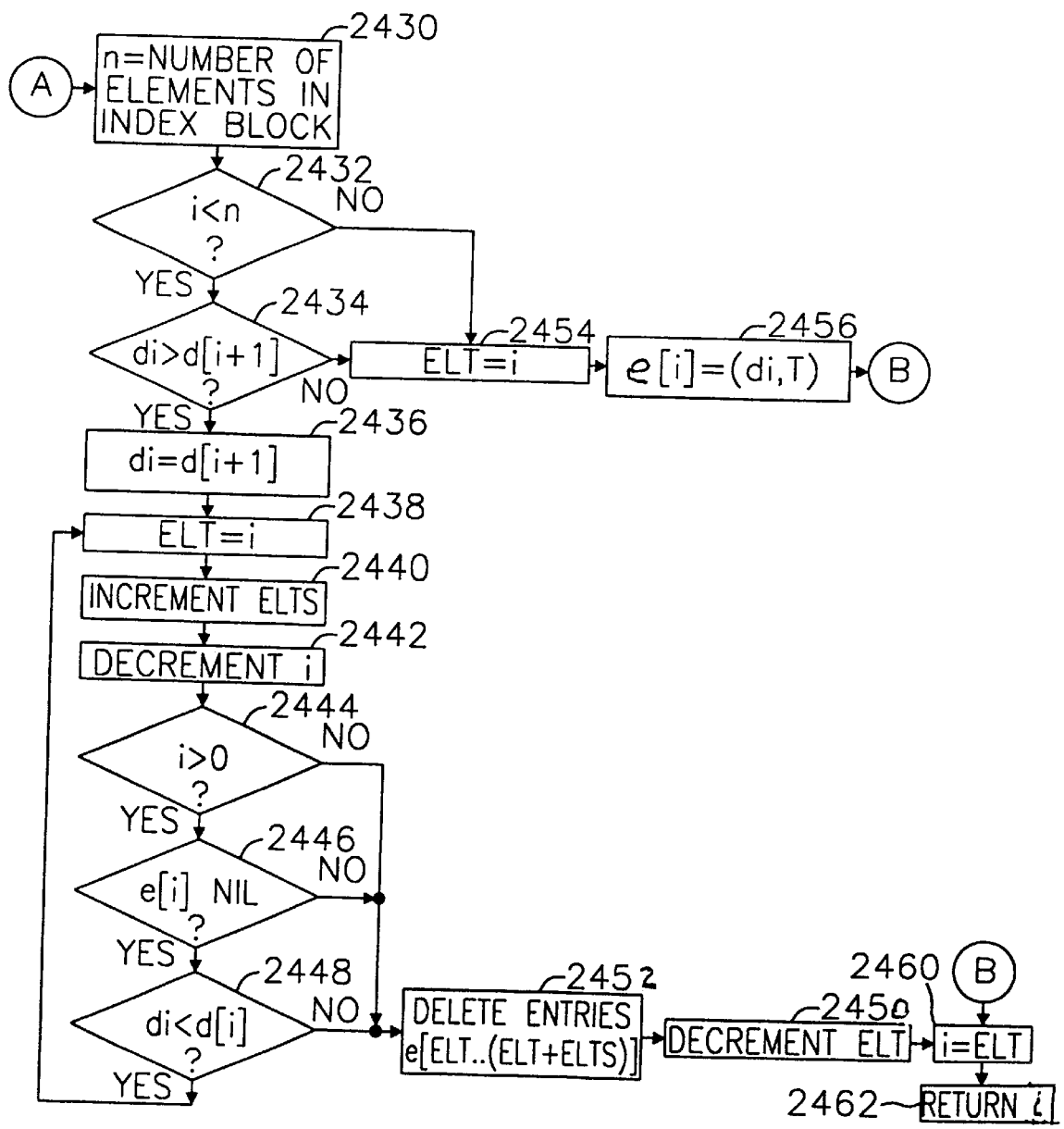

FIGS. 11a and 11b illustrate a flow diagram of a delete depths process. The delete depths process is provided an index of an entry to be deleted from an index block. The delete depths process may result in the item requested for deletion merely being modified to indicate that the entry in the index block is not associated with data. This is accomplished by setting the data present indicator to indicate that data is not present. The delete depths procedure may also result in deletion of the entry corresponding to the index and the removal of unnecessary NIL entries in the index block preceding the removed entry. Operation of the delete depths procedure may also result in the depth value of a preceding entry in the index block being replaced by a depth value of the entry to be deleted, along with the deletion of unnecessary NIL entries preceding the entry whose depth value has been replaced by the depth value of the entry to be deleted.

Operation of the delete depths process, and further elaboration thereof, is illustrated in the flowcharts of FIGS. 11a and 11b. In Step 2400 the process initializes an elts variable to zero and a di variable to d[i]. The elts variable is used as an length in determining the number of entries, including NIL entries, to be deleted. The di variable is used as a temporary variable to store a depth value, with the depth value initially the depth value of the entry requested for deletion. In Step 2402 the process determines if the entry to be deleted is the first entry in the index block. If the entry is the first entry in the index block then the process goes to Step 2404.

If the entry requested for deletion is not the first entry in the index block then the process determines if the depth value of the entry requested for deletion is less than the depth value of the entry immediately preceding the entry to be deleted. If the depth value of the entry to be deleted is not less than the entry of the immediately preceding depth value then the process also goes to Step 2404. If the depth value of the entry to be deleted is less than the depth value of the preceding entry then the process determines if the preceding entry is a NIL entry in Step 2408. If the preceding entry is a NIL entry then the process sets the entry requested for deletion to be a NIL entry in Step 2410. If the process determined that the preceding entry was not a NIL entry in Step 2408, or after execution of Step 2410, the process decrements the counter indicating the entry to be deleted in Step 2412. In Step 2414 the process sets an elt variable, indicating the lower range of entries to be deleted, to the decremented index of the entry in Step 2414. In Step 2416 the process increments the elts variable. In Step 2418 the process again decrements the counter indicating the entry to be deleted.

In Steps 2420, 2422, and 2424 the process determines if the i counter has been decremented past the beginning of the index block, if the entry indicated by the i counter is a NIL entry and if the depth entry of the entry of the i counter is greater than the depth value of the entry requested for deletion. If all the above conditions are true, then the process returns to Step 2414. Otherwise, the process deletes the entries in the index block from an inclusive lower range of elt to an upper range of elt plus elts. The process then continues to Step 2428.

If in Step 2402 or Step 2406 the process determined that the entry requested for deletion is the first entry in the index block, or if the depth value of the entry preceding the entry requested for deletion, is greater than the depth value of the entry requested for deletion, then the process continues to Step 2404. In Step 2430 the process determines the total number of elements in the current index block. In Step 2432 the process determines if the entry requested for deletion is the last entry in the index block. If the entry requested for deletion is not the last entry in the index block, then the process determines if the depth value of the entry requested for deletion is greater than the depth value of the subsequent entry in the index block in Step 2434. If the entry requested for deletion is the last entry in the index block or if the depth value of the entry requested for deletion is less than the depth value of the subsequent in the index block, then the process sets the elt variable to the value indicating the entry requested for deletion in Step 2454. In Step 2456 the process sets the data present indicator of the entry requested for deletion to indicate that data is not present. The process then executes the exit steps of setting the i counter equal to elt in Step 2460 and then returning the i counter value in Step 2462.

If the process determines that the depth value of the entry requested for deletion is greater than the depth value of the subsequent entry in the index block then the process sets the comparison depth value to the depth value of the subsequent entry in Step 2436. The process then sets the lower range of the entries to be deleted equal to the i counter in Step 2438. In Step 2440 the process increments the elts length variable. In Step 2442 the process decrements the i counter. In Steps 2444, 2446, and 2448 the process determines if the i counter has gone beyond the first entry in the index block and if the entry indicated by the i counter is a NIL entry, and if the depth value of the entry indicated by the i counter is greater than the temporary depth value variable. If all of these conditions are true, then the process returns to Step 2438. Otherwise, the process decrements the elts variable in Step 2450 and deletes the entries in the index block ranging from the entry indicated by the elt variable to an exclusive upper range of entries indicated by the elts variable in Step 2452. The process then executes the exit steps of setting the i counter equal to the elt variable in Step 2460 and returns the i counter variable to the calling procedure in Step 2462.

e) Check and Merge Nodes

After completion of the leaf delete process, an index block may be underfilled. Accordingly, the check and merge nodes process examines adjacent index blocks in the data structure and determines if index block merging is appropriate. If index block merging is appropriate the check and merge nodes process calls a subprocess, a merge nodes subprocess, which accomplishes the merger of adjacent index blocks. The merging of two index blocks additionally requires deletion of an entry in a parent index block, so the merging operation is accomplished within the constraints of maintaining the data structure structural requirements. Therefore, the check and merge nodes process first examines depth entries of a parent index block and, if appropriate, examines the size and type of the merge candidate child index blocks. If the size of the combined index blocks is less than a predefined limit, and if the index blocks are of the same type, then the merge nodes subprocess is called to accomplish the merger. The process repeats, examining additional depth entries and, if appropriate, child index blocks until optimal merging is complete.

Figure 12A:
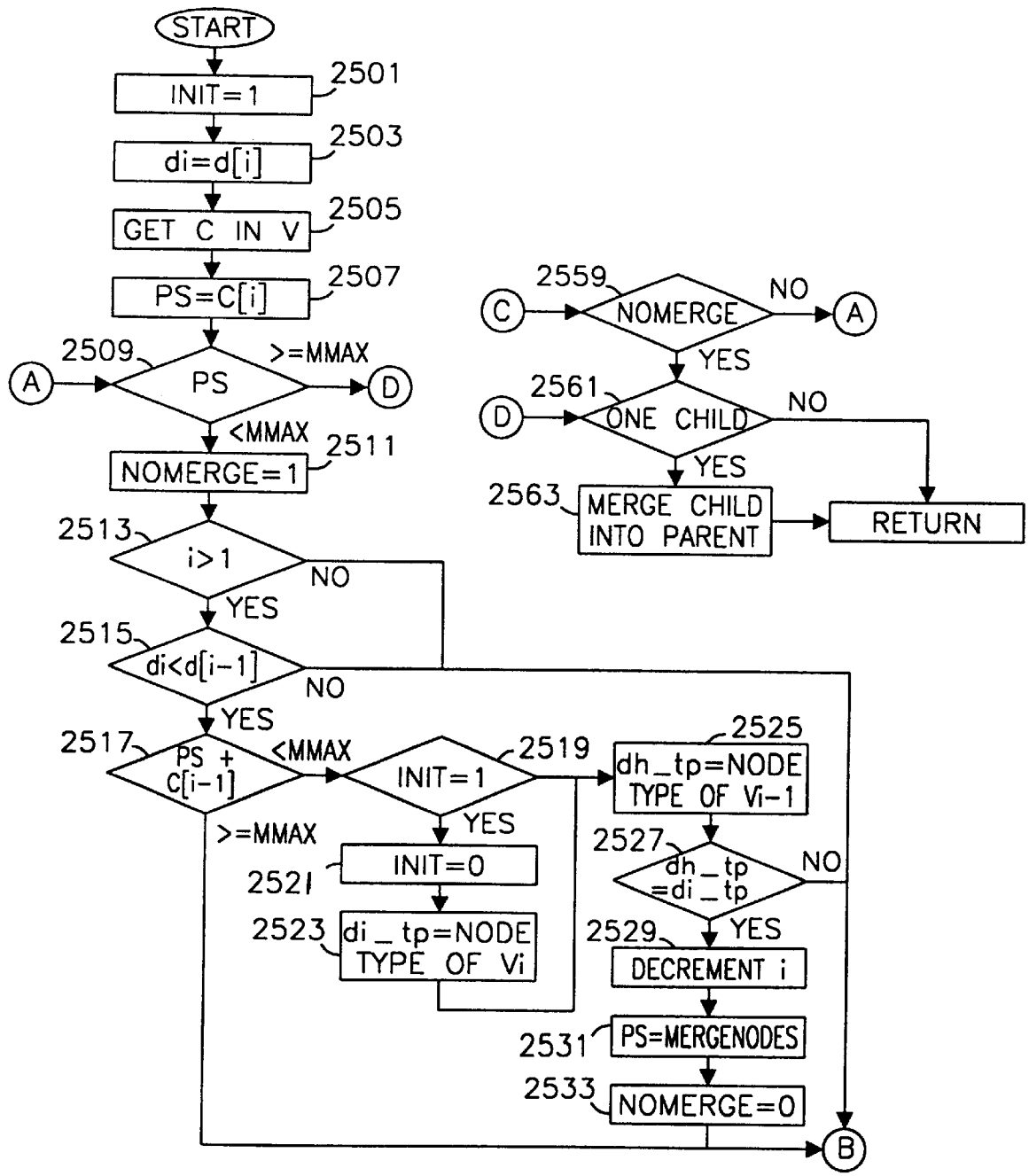
FIGS. 12a and 12b illustrate a flow diagram of a check and merge nodes process of the present invention.
Figure 12B:
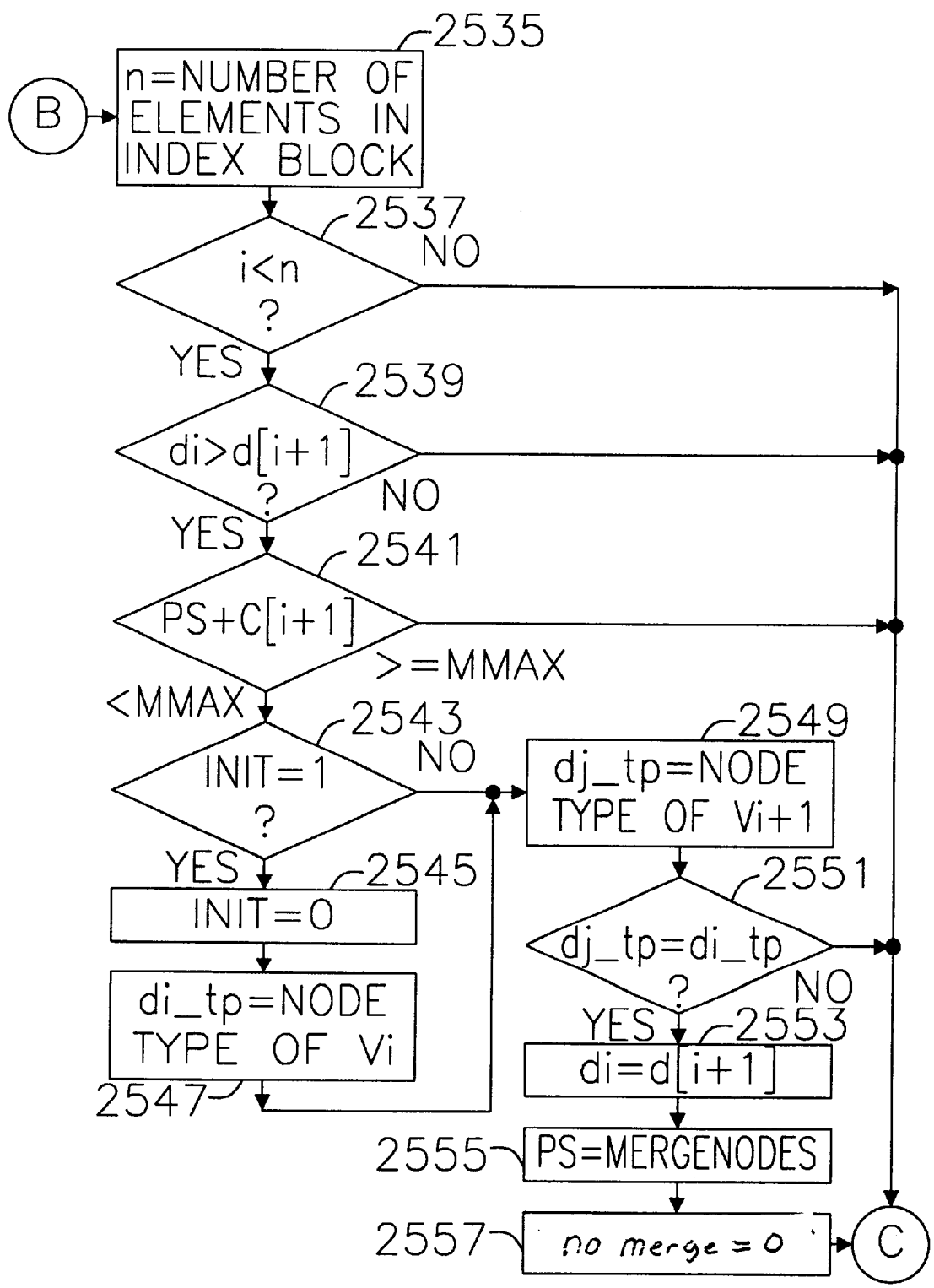

A flow chart of the check and merge nodes process is illustrated in FIGS. 12a and 12b. In Step 2501 the process sets an init variable to true. The INIT variable is later used in setting a variable indicating the node type of a first child index block. In Step 2503, the process sets a local di variable to the depth of the current entry, as indicated by the i counter. In Step 2505 the process obtains the non-NIL count values. In Step 2507 the process sets a count variable ps equal to the number of non-NIL entries in the subtree index block associated with the current entry. The process then determines whether the number of non-NIL entries in the child index block is less than a predefined merge maximum value in Step 2509. If the number of non-NIL entries in the child index block is greater than or equal to the predefined merge maximum value then the process executes exit steps. If the child index block has fewer non-NIL entries than the merge maximum then the child index block is a merge nodes candidate.

Accordingly, the process sets a nomerge flag in Step 2511 to true, indicating no merger has yet taken place, begins determining if a merger between the child index block and either the previous index block or the subsequent index block is appropriate. In Step 2513 the process then determines if the current entry is the first entry in the index block. If the entry under consideration is not the first entry in the index block then the process determines if the value of the current depth entry is less than the value of the depth entry of the preceding entry in the index block in Step 2515.

If the depth value of the current entry is less than the depth value of the preceding entry, then the process determines if the child index block associated with the current entry can be merged with the child index block associated with the preceding entry. The process accomplishes this by first determining the total number of non-NIL entries in the two child index blocks and comparing that total with the predefined merge maximum value in Step 2517. If the total number of non-NIL entries in the two index blocks are less than the merge maximum value the process determines if the init variable is equal to one in Step 2519. If the init variable is equal to one the process sets the init variable to zero in Step 2521 and sets a current entry node type variable to the node type of the current entry in Step 2523. If the process determines that the init variable is not equal to one in Step 2519, or after execution of Step 2523, the process sets a previous entry node type variable equal to the node type of the entry preceding the current entry in Step 2525. In Step 2527 the process determines if the node type of the current entry and the node type of the immediately preceding entry are of the same type. If the two node types are not of the same type then the nodes can not be merged.

If the process determines that the two node types are of the same node type then the process decrements the i counter, indicating the current entry, in Step 2529 and executes the merge nodes subprocess in Step 2531. In Step 2533 the process then sets the nomerge flag to false since a merge now has occurred.

If the process determines in Step 2513 that the current entry is the first entry in the index block, or if the process determines in Step 2515 that the value of the depth value of the preceding entry is not less than the depth value of the current entry, or if the process determines that the combined size of index blocks to be merged exceeds the maximum index block size in Step 2517, or if the process determines that the two nodes are of different types in Step 2527, or after setting the node merge flag to false in Step 2533, the process proceeds to Step 2535.

In Step 2535, the process determines the number of elements in the current index block. The process then determines if the current entry is the last entry in the index block in Step 2537. If the current entry is not the last entry in the index block then the process determines if the depth value of the current entry is greater than the depth value of the subsequent entry in the index block in Step 2539. If the depth value of the current entry is greater than the depth value of the subsequent entry then the process determines if the number of combined entries in the child index block associated with the current entry and the child index block associated with the subsequent entry are less than merge maximum value in Step 2541.

If the total number of non-NIL entries in the two child index blocks is less than the merge maximum value then the process determines, as a preview to determining whether the two candidate merger nodes are of the same type, whether the init variable is equal to one in Step 2543. If the init variable is equal to one then the process sets the init variable to zero in Step 2545 and sets the current node type variable equal to the node type of the current entry. After executing Step 2547, or if the init variable is determined to be zero in Step 2543, the process sets a subsequent node type variable equal to the node type of the subsequent entry in Step 2549. In Step 2551 the process determines if the two child index blocks are of the same type. If the two child index blocks are of the same type then the process sets the current entry depth value variable di equal to the depth value of the subsequent entry in Step 2553 and causes execution of the merge nodes subprocess in Step 2555. The process then sets the nomerge variable to false in Step 2557.

The process then examines the nomerge flag in Step 2559. The process also causes execution of Step 2559 if the process determines that the current entry is the last entry in the index block in Step 2537, or that the depth value of the current entry is not greater than the depth value of the subsequent entry in Step 2539, or that the combined total of non-NIL entries in the two child index blocks is greater than the merge maximum value in Step 2541, or that the two merge candidate child index blocks are of different node types in Step 2551. If the process determines that the nomerge flag is equal to false in Step 2559 the process returns to Step 2509 and determines if additional merging is possible. Additional merging continues until no additional merging of child index blocks associated with the current index block is possible. Once such a situation occurs, the nomerge flag will not be equal to false upon execution of Step 2559 and the process executes Step 2561.

In Step 2561, the process determines if the current index block only has a single child index block. If the current index block only has a single child index block then the process absorbs the child index block into the current index block in Step 2563. If a parent index block has only a single child index block then the parent necessarily only has a single entry, and that entry is associated with the child index block. Accordingly, the child index block may replace the parent index block. The pointer of the child index block pointing to any subtrees, if the child index block is an interior index block, also replaces the pointer of the parent index block. After merging the child index block into the current index block in Step 2563, or if the current index block has other than one child index block, the process returns.

f) Merge Nodes Subprocess

The merge nodes subprocess combines the two merger candidate child index blocks by appending one of the blocks to the other. A merger of two index blocks additionally requires, however, that the entry in the parent index block associated with the now removed child index block be deleted, and that the non-NIL counters and subtree pointers be collected.

Figure 13:
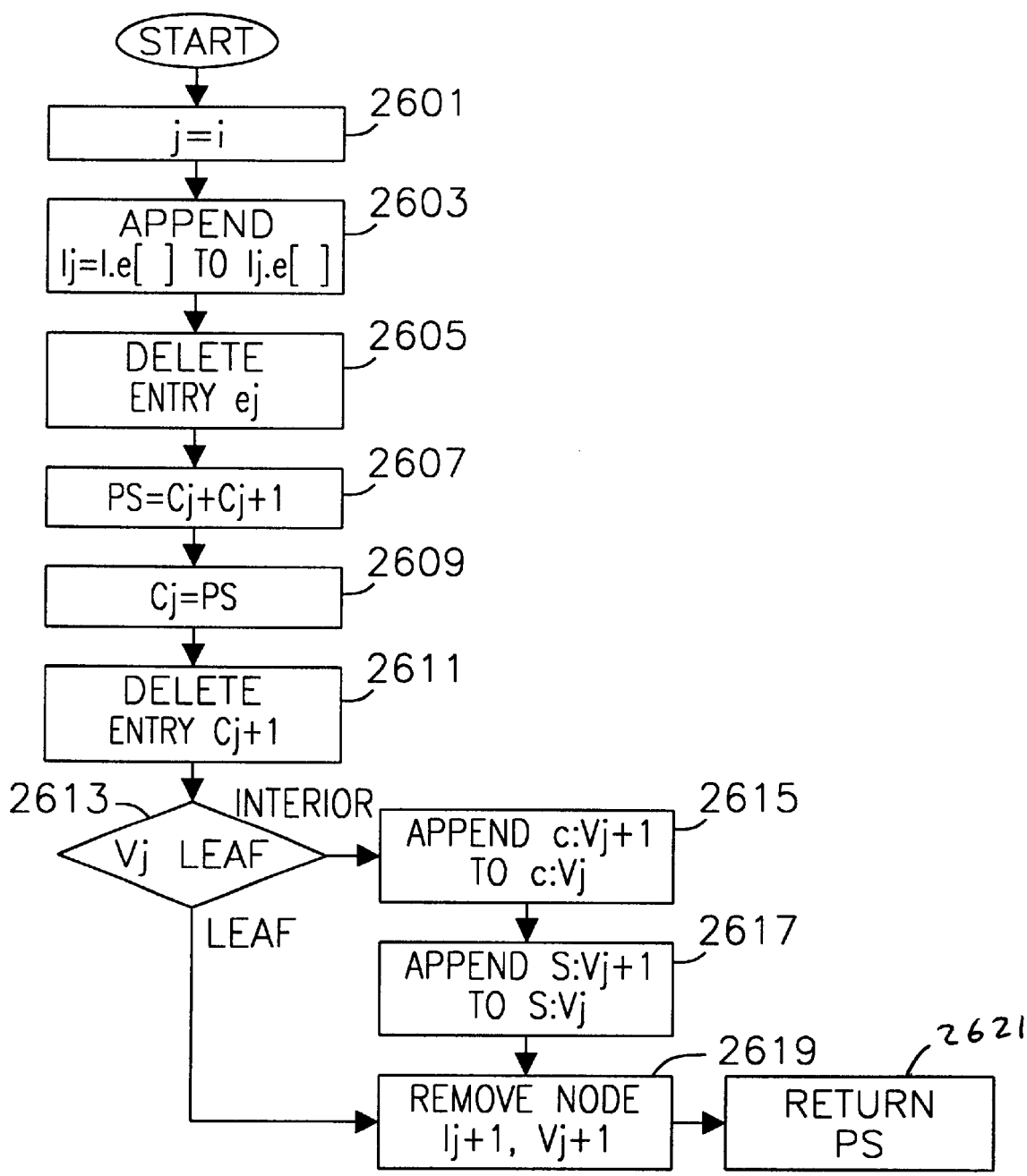
FIG. 13 illustrates a flow diagram of a merge nodes subprocess of the present invention.

A flow diagram of the merge nodes subprocess is illustrated in FIG. 13. The subprocess sets a subprocess counter j equal to the current entry counter passed in by check and merge nodes process in Step 2601. If the merge nodes subprocess is merging the child index block associated with the current entry with the child index block associated with the preceding entry, then the current entry counter indicates the preceding entry. If the merge nodes subprocess is combining the child index block associated with the current entry with the child index block associated with the subsequent entry, then the current entry counter indicates the current entry.

In Step 2603, the subprocess appends the subsequent child index block, as indicated by the j counter, to the current child index block. In Step 2605, the subprocess deletes the current index block entry in the parent index block. The subprocess then sets a ps variable, indicating the number of non-NIL entries in the current index block, equal to the number of non-NIL entries in the two combined child index blocks. In Step 2609, the subprocess then sets the non-NIL counter for the current child index block equal to the ps variable. In Step 2611, the subprocess deletes the non-NIL counter for the index block which is disappearing as a result of the merger of the two child index blocks.

In Step 2613, the subprocess then determines if the index block resulting from the merger is an interior index block or a leaf index block. If the resulting index block is an interior index block, then the process appends the non-NIL counts of the subsequent index blocks to the resulting index block in Step 2615, and in Step 2617 appends the subtrees of the subsequent block to the subtrees of the resulting block. After executing Step 2617, or if the resulting index block has been determined to be a leaf index block in Step 2613, the process removes the subsequent index block which is no longer used as a result of the merger of the two child index blocks. The process then returns the value of ps in Step 2621.

g) Sample Alternative Implementations

Those skilled in the art will recognize that the above described processes and subprocesses may be implemented in a variety of ways. For example, the branch delete process and the leaf delete process may be implemented with a reduced reliance on local variables, and the check and merge nodes process may be simplified.

Figure 14:
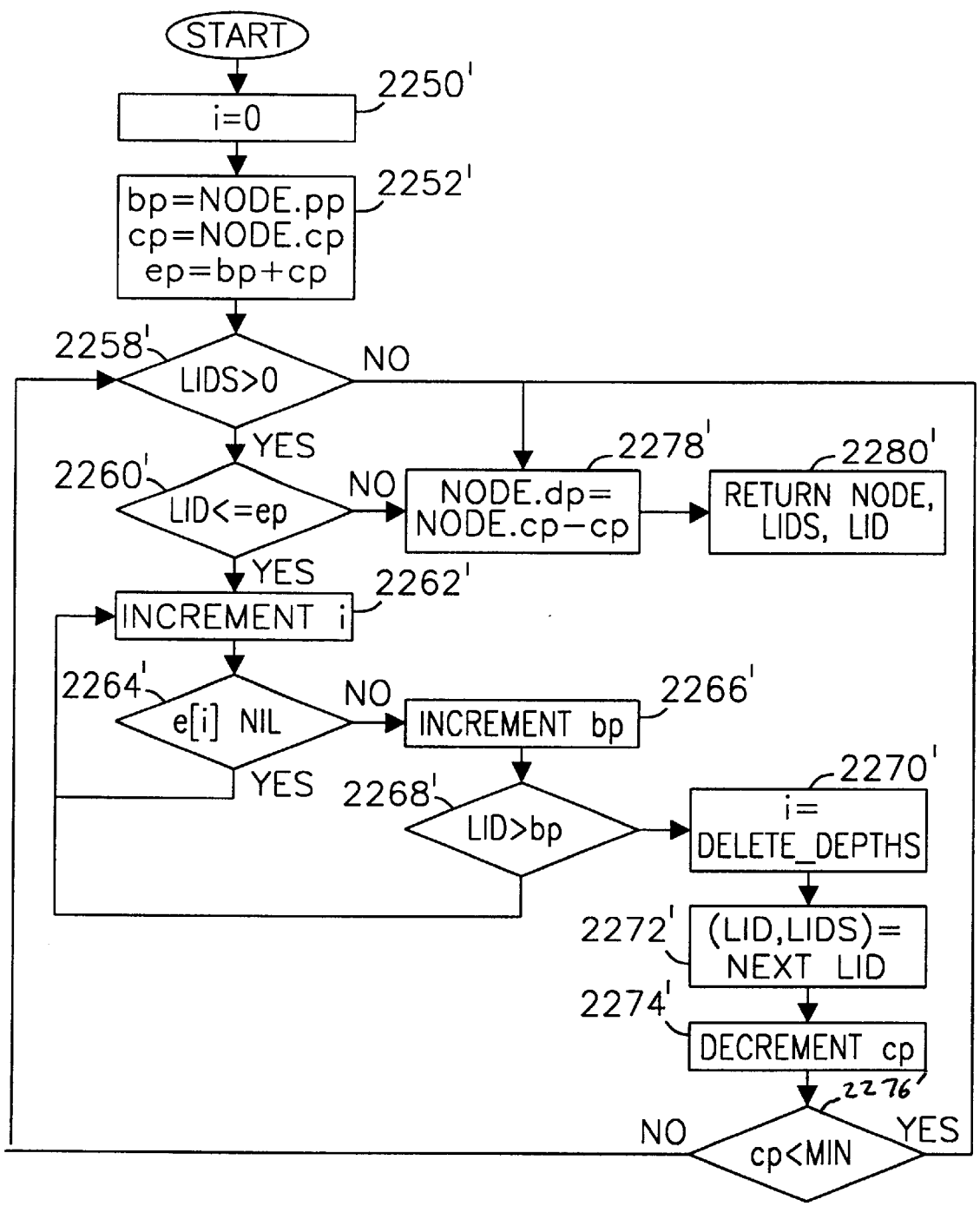
FIG. 14 illustrates a flow diagram of an alternative leaf delete process of the present invention.

FIG. 14 illustrates a flow diagram of an alternative leaf delete process. The alternative leaf delete process is substantially similar to the leaf delete process described with respect to FIG. 10. For example, Steps 2250', 2258', 2260', 2262', 2264', 2266', 2268', 2270', 2272', 2274', and 2276' of the alternative leaf delete process of FIG. 14 corresponds to Steps 2250, 2258, 2260, 2262, 2264, 2266, 2268, 2270, 2272, 2274, and 2276 of the leaf delete process of FIG. 10. Additionally, Step 2252' corresponds to Steps 2252, 2254, and 2256 of the leaf delete process of FIG. 10.

The exit steps of the alternative leaf delete process of FIG. 14 are, however, modified. Instead of using a dp variable to indicate the number of non-NIL items in the index block after the deletion of entries, and returning that variable to the calling process, the alternative leaf delete process instead modifies node related information pertaining to the index block. Thus, in Step 2278' the alternative leaf delete process sets a node.dp variable equal to the number of non-NIL entries in the index block after deletion of entries. In Step 2280' the alternative leaf delete process returns the node information in place of the dp variable.

Figure 15:
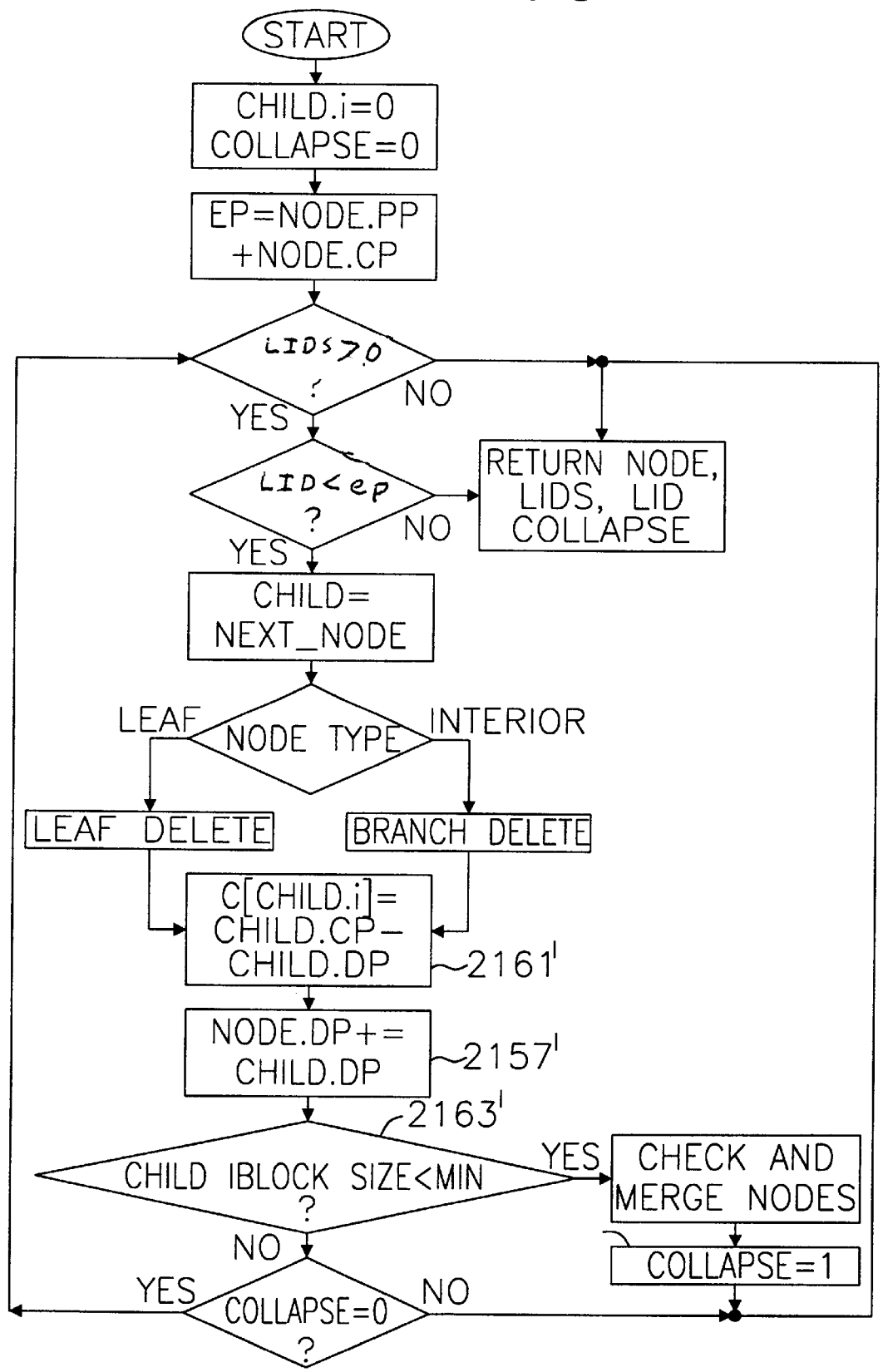
FIG. 15 illustrates a flow diagram of an alternative branch delete process of the present invention.

Accordingly, an alternative branch delete process is used in conjunction with the alternate leaf delete process, with the alternative branch delete process making use of the node information instead of the returned dp variable. A flow diagram of the alternative branch delete process is illustrated in FIG. 15. The alternative branch delete process of FIG. 15 is substantially similar to the branch delete process of FIG. 8. The alternative branch delete process of FIG. 15, however, uses the node related information provided by the leaf delete process, and additionally modifies other node related information, instead of using a dp variable.

The alternative branch delete process additionally does not make use of the xp variable indicating the number of entries deleted. Instead, the alternative of branch delete process merely updates a node entries deleted variable, node.dp. Thus, the alternative branch delete process has no step corresponding to Step 2135, in which the xp variable is initialized to the dp variable, of the branch delete process of FIG. 8. Instead, the alternative branch delete process includes in place of Step 2157 of the branch delete process of FIG. 8 a Step 2157' in which the node.dp variable is incremented by the number of entries deleted during traversal of the child index blocks of the node, with a child.dp variable, which was returned as part of the node information from either the leaf delete process or the branch delete process, indicating the number of entries deleted in the child index blocks.

Further, Steps 2159 and 2161 of the branch delete process of FIG. 8 are also combined in the alternative branch delete process in a Step 2161'. In Step 2161', the alternative branch delete process sets the C[child.i] variable, indicating the number of non-NIL entries associated with the node, equal to the number of non-NIL entries in the child index block prior to the deletion minus the number of entries deleted in the child index block. These values are also returned by the leaf delete process, and the branch delete process, as part of the process return. In addition, Step 2163 of the branch delete process of FIG. 8 is modified in the alternative branch delete process of FIG. 15 at Step 2163' by directly examining the size of the child index block instead of examining a local cp variable which reflects the number of non-NIL entries in the corresponding index block.

Figure 16:
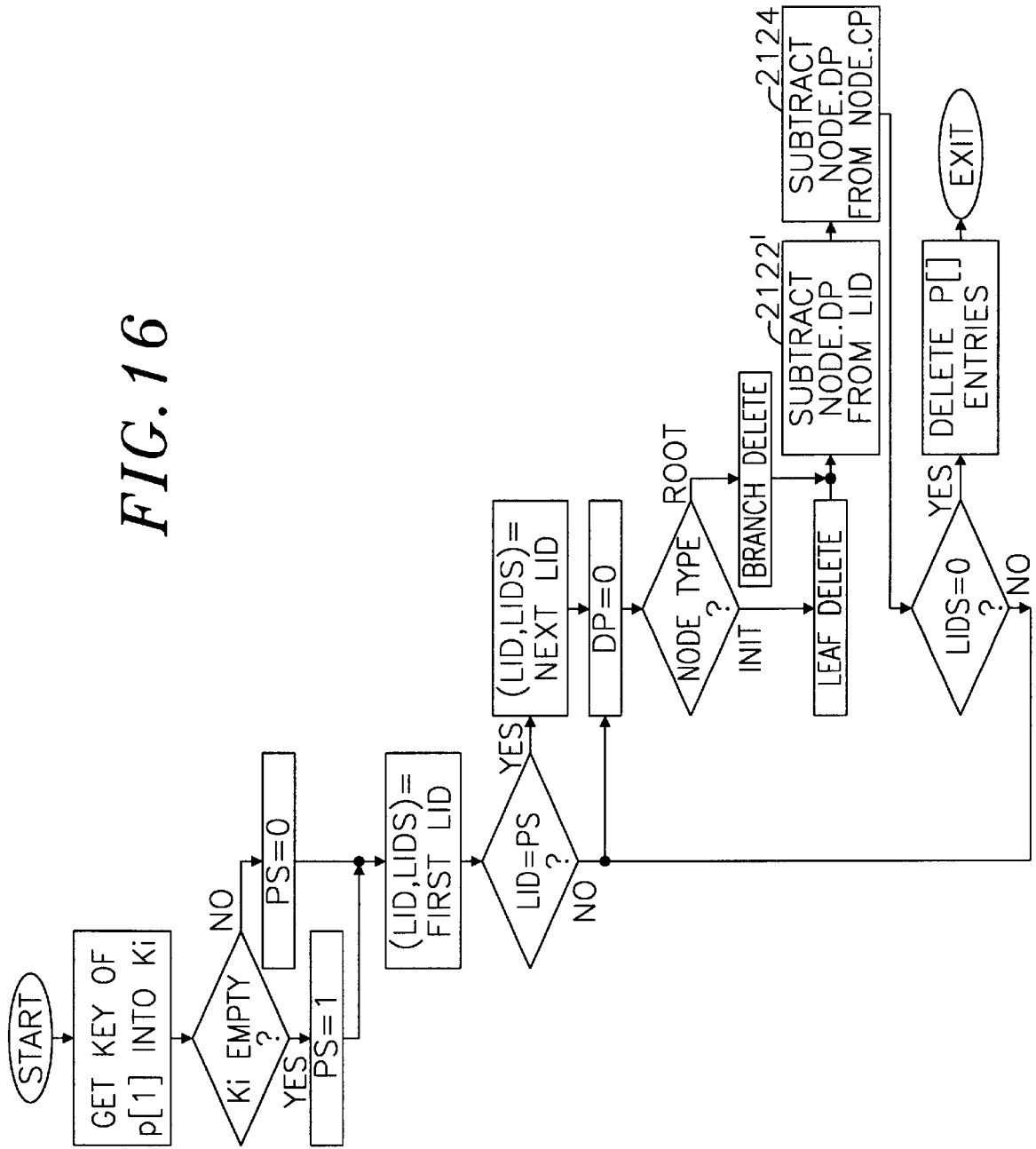
FIG. 16 illustrates a flow diagram of an alternative bulk delete process of the present invention.

Similarly, use of the node related information requires modification of the bulk delete process of FIG. 7. Specifically, in an alternative bulk delete process, Step 2114 is unnecessary, and Steps 2122 and 2124 require modification. Step 2122 of the bulk delete process of FIG. 7 utilizes the dp variable, indicating the number of entries deleted, to adjust the highest and lowest of lexical identifiers of entries requested for deletion to account for deleted entries, and Step 2124 adjusts the number of non-NIL entries in a node by the number of items deleted. As in FIG. 16, which illustrates a flow diagram of an alternative bulk delete process, of FIG. 7 are replaced by Steps 2122' and 2124' in the alternative bulk delete process. Instead of using the dp variable, however, Steps 2122' and 2124' of the alternative branch delete process merely replace the dp variable with the node.dp variable.

Figure 17A:
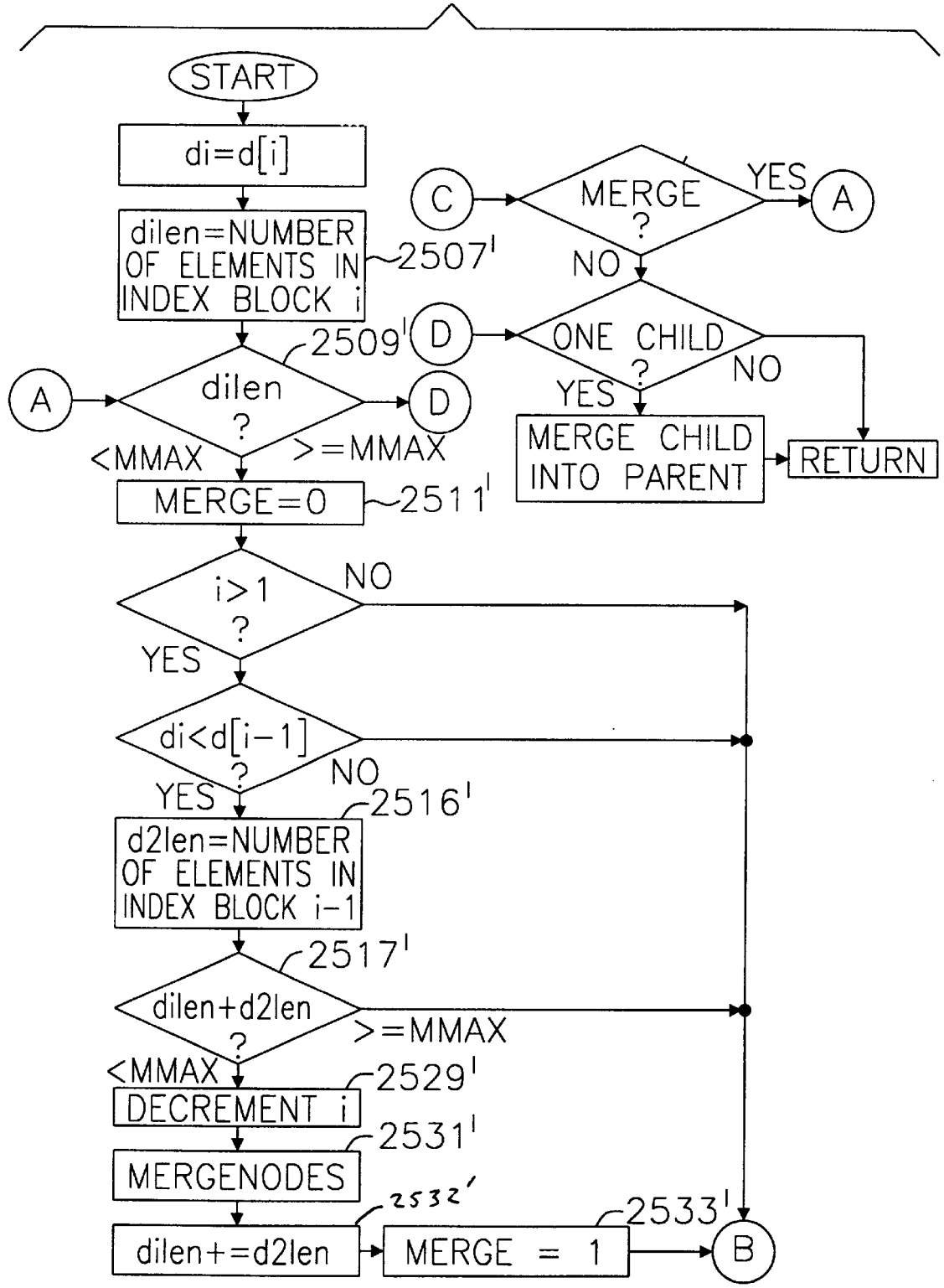
FIGS. 17a and 17b illustrate a flow diagram of an alterative check and merge nodes process of the present invention.
Figure 17B:
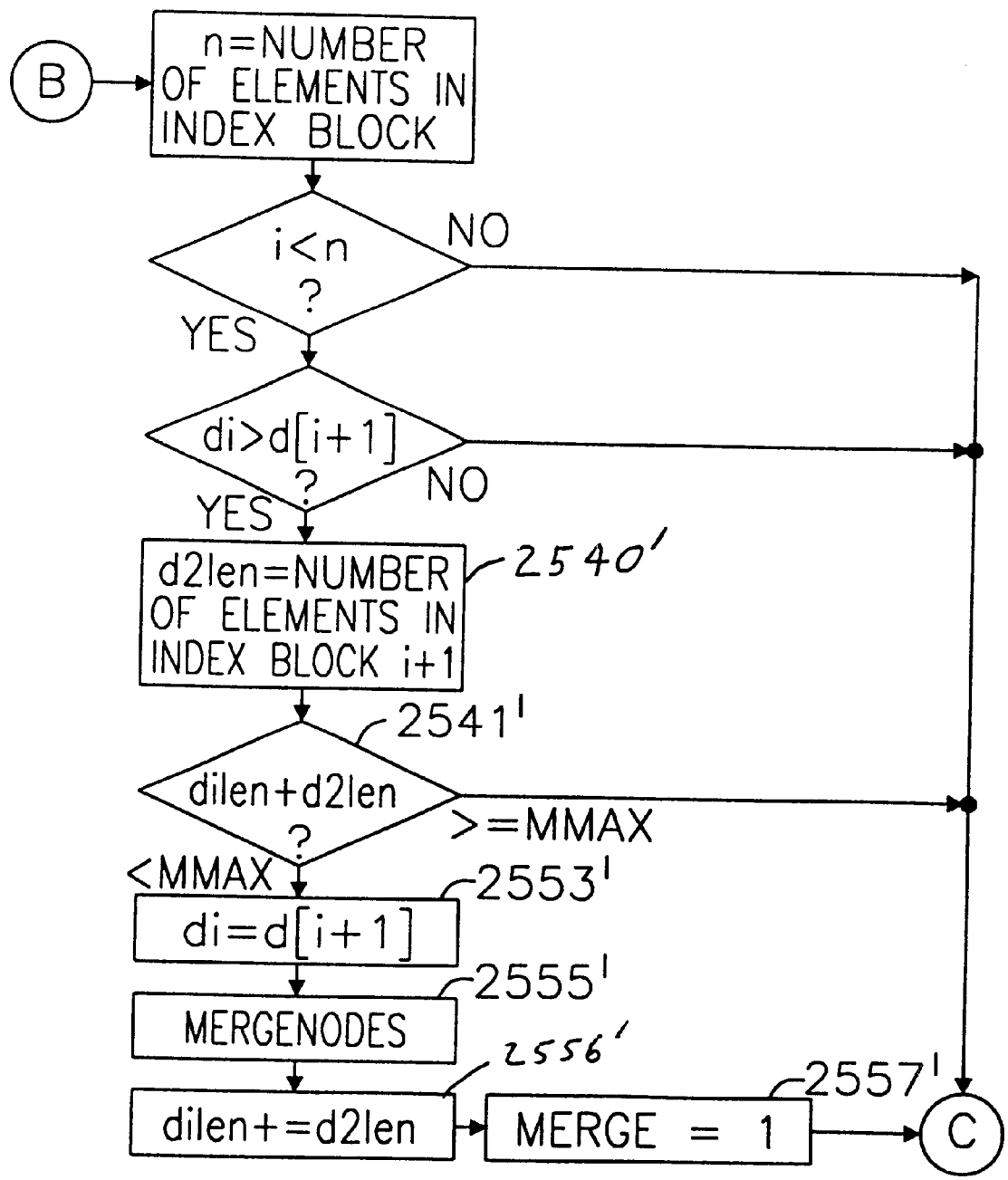

A flow diagram of an alternative check and merge node process is provided in FIGS. 17a and 17b. The alternative of check and merge nodes process is similar to the check and merge nodes process of FIGS. 12a and 12b, but the alternative process does not check node types prior to merging, and examines the size of the index block, not the number of non-NIL entries in the index block variables in place of other temporary variables. As the alternative check and merge nodes process does not check node types, Steps 2501, 2519, 2521, 2543, and 2545 of the check and merge nodes process of FIGS. 12a and 12b which involve the init variable used to determine whether to set a variable indicating the type of the current node, have no corresponding steps in the alternative check and merge nodes process. Similarly, Steps 2523, 2525, 2527, 2547, 2549, and 2551, of the check and merge nodes process of FIGS. 12a and 12b, which involve the setting and comparing of node type variables, also have no corresponding steps in the alternative check and merge nodes process. Further, as the length variables are used in place of the ps variable, the merge nodes subprocess is no longer required to return to the value of the ps variable.

Accordingly, the present invention provides a system and methodology for deleting items from a data structure. Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims and their equivalents rather than the foregoing description.

TABLE 1

| Leaf | Key Interval of Leaf Node | Bounding Node Node - Depth |
| --- | --- | --- |
| H | 00000000–00100000 | I - 3 |
| I | 00100000–01000000 | e - 2 |
| V | 01000000–01000100 | W - 6 |
| W | 01000100–10000000 | c - 1 |
| L | 10000000–10100000 | m - 3 |
| T | 10100000–10101000 | u - 5 |
| Z | 10101000–10101010 | A' - 7 |
| A' | 10101010–10110000 | Q - 4 |
| Q | 10110000–11111111 | 0 |

TABLE 2

| Steps | Level | k | b[k] | j | d[j] | c | ps | c + ps |
| --- | --- | --- | --- | --- | --- | --- | --- | --- |
| 1 | 0 | 1 | 1 | 1 | 2 | | | |
| 2 | (ROOT) | 1 | 1 | 2 | 1 | | | |
| 3 | | 2 | 4 | 3 | 0 | | | |
| 4 | | | | | | | | 8 + 6 = 14 |
| 5 | 1 | 2 | 4 | 1 | 4 | | | |
| 6 | (INTERIOR - 3rd Node) | 3 | 5 | 2 | 2 | | | |
| 7 | | | | | | | | 14 + 5 = 19 |
| 8 | 2 | 3 | 5 | 1 | 6 | 0 | | |
| 9 | (LEAF-2nd Node) | 3 | 5 | 2 | 7 | 1 | | |
| 10 | | 3 | 5 | 3 | 5 | 2 | | |
| 11 | | 4 | 8 | 4 | 8 | 3 | | |
| 12 | | 5 | 9 | 5 | 6 | 3 | | |
| 13 | | | | | | | | 23 |

What is claimed is:

1. A method using a computer of performing deletions from an index block, the index block having a plurality of entries, each entry comprising a depth value and a data present indicator indicating that data is present or absent, and each entry for which the data present indicator indicates that data is present being associated with a corresponding one of a plurality of value pointers, the value pointers maintained in lexical order, the method comprising:

providing a lexical identifier of an unnecessary value pointer, the lexical identifier comprising the lexical position of the value pointer in the lexical order of value pointers; and locating the entry associated with the unnecessary value pointer using the lexical identifier and the data present indicator of entries in the index block.

2. The method of claim 1 further comprising the step of determining if the entry associated with the unnecessary value pointer may be deleted.

3. The method of claim 2 further comprising the step of deleting the entry associated with the unnecessary value pointer if the entry may be deleted.

4. The method of claim 2 further comprising the step of setting the data present indicator of the entry associated with the unnecessary value pointer to indicate that data is absent.

5. A method using a computer of performing deletions of entries from a hierarchial tree structure, the tree structure having a plurality of interconnected entries including a root index block having root entries, the root entries being associated with interior index blocks having interior entries, and the interior index blocks being associated with leaf index blocks having leaf entries, each entry comprising a depth value, with the leaf entries additionally comprising a data present indicator, each data present indicator indicating presence or absence of a data item in stored data associated with the corresponding leaf entry, each depth value with a corresponding data present indicator indicating the presence of a data item being associated with a value pointer pointing to the corresponding data item, the value pointers sorted in a lexical order, each index block other than the root index block being associated with a stored count of a number of entries associated with the entries of index block, the method comprising:

providing a lexical identifier of an unnecessary value pointer, the lexical identifier comprising the lexical position of the value pointer in the lexical order of value pointers; and locating an index block containing the entry associated with the unnecessary value pointer using the lexical identifier and at least one stored count.

6. A method of deleting search keys from a data storage structure, the data storage structure comprising a plurality of index blocks, each index block comprising a plurality of entries, each entry comprising a discriminator forming a depth value and a data present indicator indicating NIL or data available, a plurality of value pointers, maintained in lexical order, each value pointer pointing to a value and being associated with a corresponding one discriminator of an entry for which the data present indicator indicates data is available, the method comprising:

forming a list of lexical identifiers of unnecessary value pointers, each of the lexical identifiers in the list of lexical identifiers comprising the lexical position of the necessary value pointers;

locating the entries corresponding to the unnecessary value pointers in a first index block using the lexical identifiers and the data present indicators;

setting the data present indicators of the entries corresponding to the unnecessary value pointers in the first index block to NIL;

repeating the steps of locating and setting for each index block of the plurality of index blocks.

* * * * *